United States Patent [19]
Call et al.

[11] Patent Number: 5,892,939
[45] Date of Patent: Apr. 6, 1999

[54] EMULATOR FOR VISUAL DISPLAY OBJECT FILES AND METHOD OF OPERATION THEREOF

[75] Inventors: William L. Call, Phoenix; Laurence A. Clawson, Cave Creek; Paul S. Connolly, Glendale; Ronald J. Freimark; Jay W. Gustin, both of Scottsdale; Michael L. Hodge, Cave Creek, all of Ariz.; Paul McGaugh, San Antonio, Tex.; Donald W. Moore, Phoenix, Ariz.; Elliott H. Rachlin, Scottsdale, Ariz.; Steven C. Ramsdell, Phoenix, Ariz.

[73] Assignee: Honeywell Inc., Minneapolis, Minn.

[21] Appl. No.: 727,727

[22] Filed: Oct. 7, 1996

[51] Int. Cl.[6] .................................................. G06F 9/455
[52] U.S. Cl. ........................ 395/500; 340/706; 364/200; 364/468.03; 365/112; 365/157; 365/172.5; 365/500; 365/527; 365/700
[58] Field of Search ................................ 395/157, 172.5, 395/500, 527, 700, 112; 364/200, 468.03; 340/706

[56] References Cited

U.S. PATENT DOCUMENTS

| | | | |
|---|---|---|---|
| 3,955,180 | 5/1976 | Hirtle | 340/172.5 |
| 4,899,136 | 2/1990 | Beard et al. | 340/706 |
| 4,942,514 | 7/1990 | Miyagaki et al. | 364/190 |
| 5,113,517 | 5/1992 | Beard et al. | 364/200 |
| 5,345,389 | 9/1994 | Calvin et al. | 364/473 |
| 5,386,503 | 1/1995 | Staggs et al. | 395/157 |
| 5,475,845 | 12/1995 | Orton et al. | 395/700 |
| 5,745,762 | 4/1998 | Celi et al. | 395/681 |
| 5,752,249 | 5/1998 | Macon, Jr. et al. | 707/103 |
| 5,796,984 | 8/1998 | Pearce et al. | 395/500 |

FOREIGN PATENT DOCUMENTS

| | | | |
|---|---|---|---|
| 0 043 201 | 10/1984 | European Pat. Off. | G06F 3/037 |
| 2 266 038 | 10/1993 | United Kingdom | G06F 3/033 |
| 2266038 | 10/1993 | United Kingdom | G06F 3/033 |

OTHER PUBLICATIONS

"An Object–Oriented Operator's Interface for Real–Time Process Control Expert Systems" by James Adams; 1992; pp. 65–74.

Robinson, Peter, 'A Model for Graphical Interaction', Software Engineering Journal, pp. 263–268, Nov. 1988.

*Primary Examiner*—Kevin J. Teska
*Assistant Examiner*—Lonnie A. Knox
*Attorney, Agent, or Firm*—William A. Munck; David H. Hitt

[57] ABSTRACT

A system for, and method of, emulating, on a non-native computer, a native environment for a visual display object file for a real time process control system and a real time process control system employing the emulator. The visual display object file contains a drawing command, an address pointer for communicating data with the real time process control system and a rule for interpreting data received from a touch-sensitive screen. The system includes: (1) a display routine that causes the non-native computer to control a non-native visual display coupled thereto to display an image thereon as a function of the drawing command, (2) an address mapping routine that communicates the data between the visual display object file and the real time process control system as a function of the address pointer and (3) an input translation routine that translates data received into the non-native computer from a non-native pointing device coupled thereto into data suitable for interpretation by the rule, the system thereby allowing the non-native computer to display the image, communicate the data with the real time process control system and interpret the data received from the non-native pointing device.

51 Claims, 10 Drawing Sheets

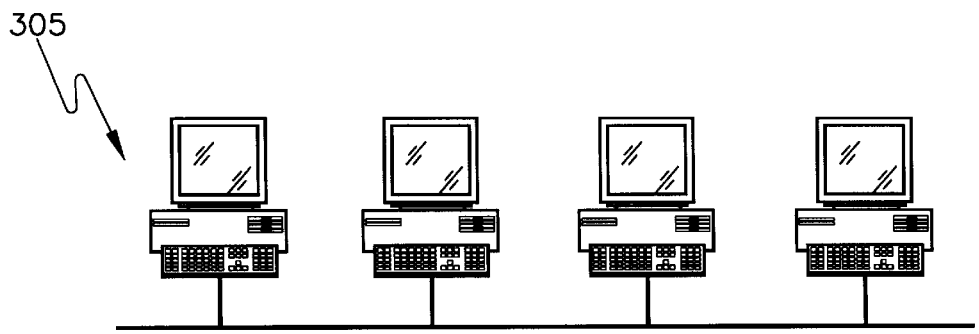
*Fig.4A(1)*
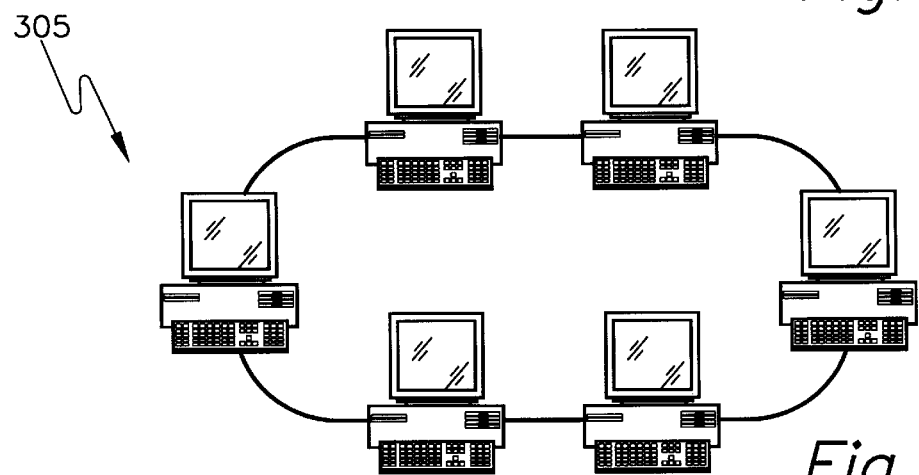
*Fig.4A(2)*
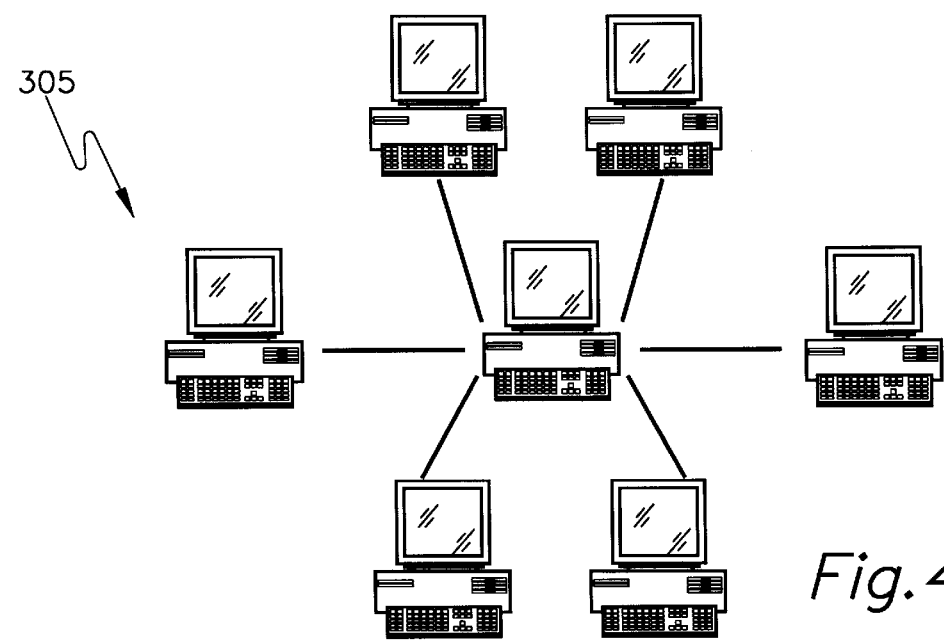
*Fig.4A(3)*

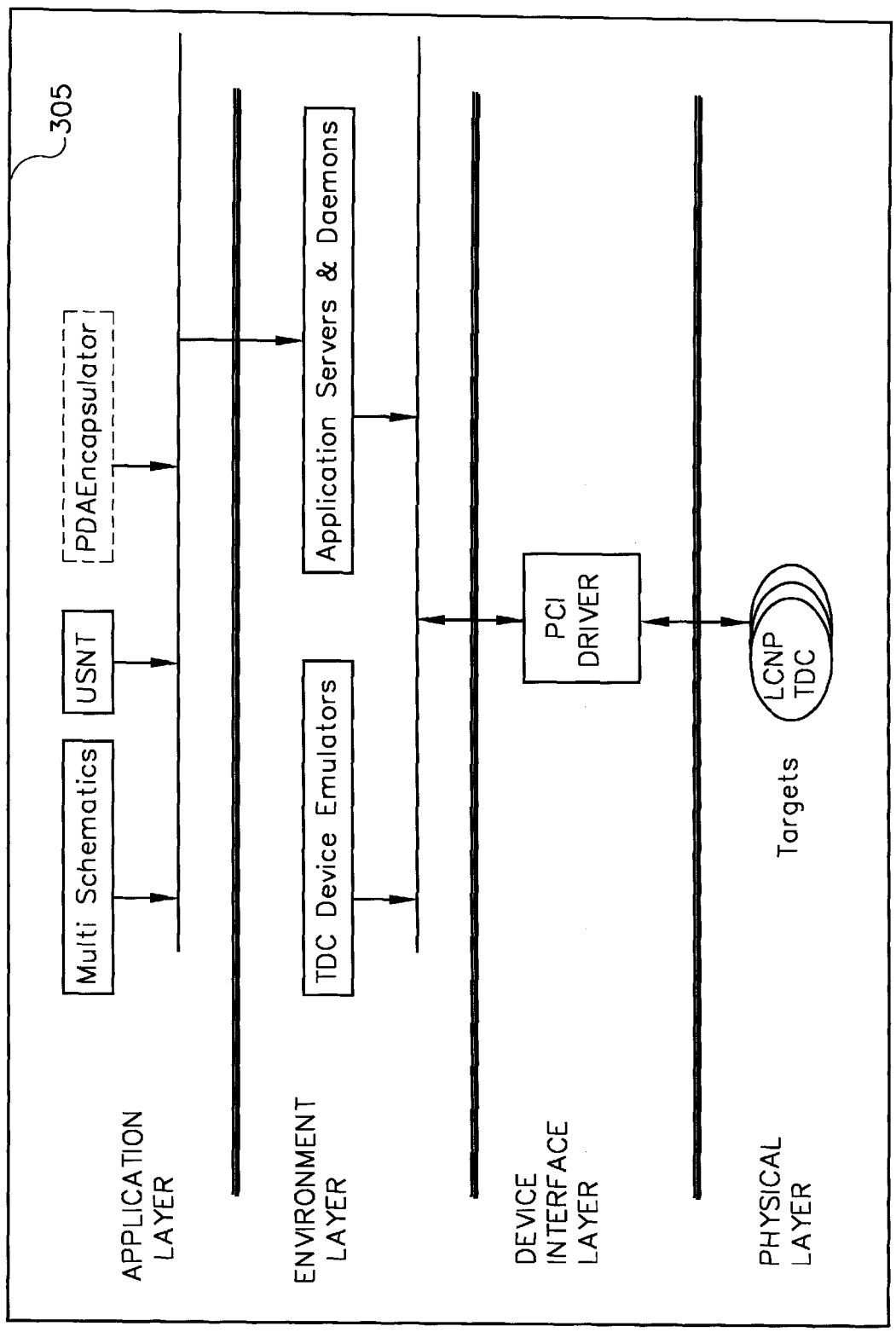

EMULATOR FOR VISUAL DISPLAY OBJECT FILES AND METHOD OF OPERATION THEREOF

CROSS-REFERENCE TO RELATED APPLICATIONS

The present invention is related to that disclosed in:

1. U.S. Pat. No. 4,607,256 issued to Henzel, on Aug. 19, 1986, entitled "Plant Management System;"

2. U.S. Pat. No. 5,333,298 issued to Bland, et al., on Jul. 26, 1994, entitled "System for Making Data Available to an Outside Software Package by Utilizing a Data File which Contains Source and Destination Information;"

3. U.S. patent application Ser. No. 08/721,254, filed on Sep. 26, 1996, entitled "System for Translating Visual Display Object files and Methods of Operation Thereof;"

4. U.S. patent application Ser. No. 08/727,724, filed on Oct. 7, 1996, entitled "Improved UOS Module for a Distributed Process Control System;" and 5. U.S. patent application Ser. No. 08/727,725, filed concurrently herewith on Oct. 7, 1996, entitled "Control Circuit,"

each reference is commonly assigned with the present invention and incorporated herein by reference for all purposes.

TECHNICAL FIELD OF THE INVENTION

The present invention is directed, in general, to computing systems and, more specifically, to an emulator for visual display object files and method of operation thereof.

BACKGROUND OF THE INVENTION

Automated plant control systems (e.g., TDC 2000 or TDC 3000 Industrial Automation Systems manufactured by, and commercially available from, HONEYWELL INCORPORATED of Phoenix, Ariz.) include a comprehensive set of algorithms and auxiliaries to control and monitor various processes within, for instance, a manufacturing facility. The control systems can be tailored to satisfy a wide range of process requirements globally or within specified portions of the facility. Conventionally, the control systems include a plurality of modules, each having its own hardware, firmware and software, linked together by a communication bus thereby resulting in a distributed process control system. The distributed nature of the system affords high performance with the capability to expand the system incrementally to satisfy growth or modifications in the facility.

A first objective of automated plant management is to provide a control scheme that synthesizes plant-wide control of all processes therein to improve an overall efficiency of the facility. A second objective is to couple the control scheme to the facility by providing a real time data acquisition and monitoring scheme that monitors the operation of the facility by collecting historical and real time data and responding to deviations from desired operation that may arise and displaying the data for the benefit of an operator.

Regarding the first objective, U.S. Pat. No. 4,607,256 (previously incorporated) provides a plant-wide system for monitoring and controlling an industrial and electrical utility plant, including communication within the system and the related management of the processes within the plant. More specifically, the plant management system incorporates a "token-passing" arrangement employing separate modules of various types. A module transmits information to or receives information from another module located on a common bus. Each of the modules functions as a peer within the network and is assigned an individual network address. A token passed among the modules gives the module that possesses the token the right to access the bus and transmit a signal to the address of another module located on the bus. Automated control systems, such as the one disclosed in U.S. Pat. No. 4,607,256, are well known in the art.

Regarding the second objective, it is important to have access to current data concerning the operation of the plant and to display that data in a meaningful and useful manner to the operator. Toward this objective, the prior art has provided user interfaces that include visual displays that are graphical in nature, keyboards, pointers, touch-sensitive screens and the like. The conventional displays, as an example, contain graphical representations of devices in the plant (such as vats, pipes, pumps, etc.); operational or historical data associated with the devices are associated with the graphical representations to complete a visual paradigm for the operator.

Unfortunately, the process of creating routines or files to generate user interfaces, such as visual displays, historically has been complex and involved. To continue with the visual display example, it requires the use of conventional computer languages wherein basic graphical elements (such as points, lines or curves) are first required to be defined and then placed relative to one another to represent the devices in the plant (such as the vats, pipes or pumps). Even with the advent of conventional object-oriented programming languages, wherein the process plant devices are represented as objects consisting of their constituent basic graphical elements and wherein devices are recursively grouped into sets to form an entire visual display object file, the process of creating the file to generate a visual display has remained difficult and expensive. Of course a similar scenario may be delineated for any conventional user interface.

A substantial number of existing plant control systems use user interfaces object files developed by means of the conventional object-oriented programming languages. When considering whether to upgrade these existing systems, owners of the existing systems are reluctant to dispose of the object files in which they have invested heavily and that are reassuringly familiar to system operators. The owners would much rather upgrade invisibly and automatically to a different, possibly more technologically advanced or user friendly, retaining the "look and feel" of the user interface of their existing systems at minimal cost.

What is needed in the art is a system and method for emulating the existing system on which the object files were designed to run to avoid the expense of manual translation or redevelopment of the same.

SUMMARY OF THE INVENTION

To address the above-discussed deficiencies of the prior art, it is a primary object of the present invention to provide a system and method for emulating the existing system on which the object files were designed to run to avoid the expense of manual translation or redevelopment of the same.

In the attainment of this and other objects, one aspect of the present invention provides a system for, and method of, emulating, on a non-native computer, a native environment for a visual display object file for a real time process control system and a real time process control system employing the emulator. The visual display object file contains a drawing command, an address pointer for communicating data with the real time process control system and a rule for interpreting data received from a touch-sensitive screen. The system includes: (1) a display routine that causes the non-native computer to control a non-native visual display coupled thereto to display an image thereon as a function of the drawing command, (2) an address mapping routine that communicates the data between the visual display object file and the real time process control system as a function of the address pointer and (3) an input translation routine that translates data received into the non-native computer from a non-native pointing device coupled thereto into data suitable for interpretation by the rule, the system thereby allowing the non-native computer to display the image, communicate the data with the real time process control system and interpret the data received from the non-native pointing device.

This aspect of the present invention therefore introduces a way of emulating an environment for a visual display object file that frees the owner of having to redesign the visual display object file to function on the non-native computer. As described above, visual display object file redesign is time-consuming and expensive and may result in unintended, undetectable, but nonetheless crucial, discrepancies between the original and redesigned visual display object files. These discrepancies can introduce subtle, potentially detrimental, changes in the operation of the plant being controlled.

Therefore, by virtue of the emulation brought about by the present invention, owners may be saved the time and cost of redesign and operators can rest assured that discrepancies are not introduced by redesign, reducing operator retraining time and ensuring that the plant continues to operate as expected.

In a preferred embodiment of this aspect of the present invention, the native environment is provided on a mini-computer and the non-native computer is microprocessor-based. Of course, a mainframe or other type of computer can provide the native environment. Conventionally, however, complex real time process control systems have employed minicomputers. The non-native computer is most advantageously a personal computer.

In a preferred embodiment of this aspect of the present invention, the drawing command is directed to a whole-screen visual display and the non-native visual display is a windowed display. Those skilled in computer science are familiar with windowed visual displays and their advantages in conveying information to an operator in a flexible and intuitively understandable manner. This embodiment of the present invention allows the visual display, which has heretofore been constrained to occupy the entirety of the visual display, to fit within a window. This frees the remainder of the visual display for use by other routines and allows the window to be resized or occluded as the operator desires.

In a preferred embodiment of this aspect of the present invention, the address pointer corresponds to a physical address in the real time process control system. Conventionally, the address pointer maps directly onto elements (such as sensors and controllable devices) of the real time process control system. However, those skilled in the art will understand that simple or complex address translation schemes can be employed to allow the address pointer to assume a more flexible role in addressing the elements.

In a preferred embodiment of this aspect of the present invention, the non-native pointing device is a mouse. Of course, the non-native pointing device can be a trackball, trackpad, joystick or the like. However, the non-native pointing device is not a touch-sensitive screen, inasmuch as a touch sensitive screen is native to the visual display object file.

In a preferred embodiment of this aspect of the present invention, the address mapping routine allows bidirectional communication of data between the visual display object file and the real time process control system. This allows data to be both written to and read from the elements of the real time process control system. Of course, the broad scope of the present invention also supports unidirectional data communication, such as used by a data acquisition or telemetry system.

In a preferred embodiment of this aspect of the present invention, the system operates in conjunction with a multi-tasking operating system executing on the non-native computer. The multitasking operating system advantageously provides for concurrent task execution, allowing an operator to employ the non-native computer to monitor and control the plant, while performing another task, such as writing a memorandum, scheduling a meeting, or backing up historical data concerning the operation of the real time process control system.

In a preferred embodiment of this aspect of the present invention, the drawing command, address pointer and rule are embodied in separate objects within the visual display object file. Those skilled in the art are familiar with the concepts behind, and advantages of, object-oriented programming. The present invention can make advantageous use of objects in the visual display object file. However, the broad scope of the present invention includes other programming paradigms, such as procedures (the original paradigm) and declarations (such as employed in expert systems).

In a preferred embodiment of this aspect of the present invention, the non-native computer comprises a virtual storage device emulator that emulates a removable-media mass storage device, the emulator cooperating with the address mapping routine to provide communication of the data between the visual display object file and the real time process control system. This aspect of the present invention allows a hardware device associated with the native environment (namely, a particular type of mass storage device such as a Bernoulli® drive) to be wholly emulated in software. This allows the non-native computer to be divorced from the conventional mini- or mainframe computer hardware as much as possible.

In a preferred embodiment of this aspect of the present invention, the system is executed within a WINDOWS® NT® operating system (commercially available from Microsoft Corporation of Redmond, Wash.) executing on the non-native computer, the operating system providing a channel therethrough for communicating the data between the visual display object file and the real time process control system. Those skilled in the art are familiar with WINDOWS® NT® and its advantages. However, the broad scope of the present invention encompasses systems that are executable in any operating system, such as OS/2®, System7®, UNIX® or DOS.

In the attainment of the above primary object, yet another aspect of the present invention provides, for use in a real time process control system having a plurality of elements addressable via logical blocks stored in a native-formatted removable-media mass storage device, an emulator, executable in a non-native, multitasking operating system and employable in lieu of the mass storage device. The emulator includes: (1) a block storage file, having a structure compatible with the non-native, multitasking operating system, for containing the logical blocks and (2) an address mapping routine that cooperates with the block storage file and intercedes between a native visual display object file and the real time process control system to allow communication of data therebetween as a function of an address pointer in the native visual display object file, the address mapping routine developing an offset from the address pointer that corresponds to a particular logical block in the block storage file, the block storage file and address mapping routine thereby substitutable for the mass storage device without requiring modifications to the visual display object file.

This aspect of the present invention therefore introduces a mass storage device emulator that eliminates a need actually to drive the mass storage device with the non-native operating system. By emulating the mass storage device in software, the non-native operating system is afforded great flexibility in the ways in which it can manage the logical blocks therein.

In a preferred embodiment of this aspect of the present invention, the multitasking operating system is WINDOWS® NT®. Again, the present invention makes advantageous use of a widely known, well understood, powerful, modern operating system. However, the broad scope of the present invention encompasses systems that are executable in any operating system, such as OS/2®, System7®, UNIX® or DOS.

In a preferred embodiment of this aspect of the present invention, the block storage file is stored on a non-native mass storage device. This storage device may be a floppy or hard disk drive or an optical, magneto-optical or tape drive. However, the non-native mass storage device is not a Bernoulli® drive having a format that is native to the visual display object file.

In a preferred embodiment of this aspect of the present invention, other routines executing in the multitasking operating system are capable of using the block storage file concurrently with the address mapping routine. While not necessary to the broad scope of the present invention, concurrent use allows for data replication and backup, plant-status reporting and the like.

In a preferred embodiment of this aspect of the present invention, the particular logical block is 256 bytes in length. The broad scope of the present invention includes logical block lengths of other than 256 bytes and variable logical block lengths, as suitable to a given application.

In a preferred embodiment of this aspect of the present invention, the block storage file is stored on a single physical disk drive. However, the block storage file may span more than one physical disk drive.

In a preferred embodiment of this aspect of the present invention, the emulator further comprises a second block storage file, the address mapping routine being capable of alternatively cooperating with the second block storage file to intercede between the native visual display object file and the real time process control system to allow communication of the data therebetween. This embodiment of the present invention therefore allows multiple block storage files to be used. This may be advantageous when modifying the real time plant control system or when controlling multiple of such systems.

In still yet another aspect, the present invention provides a real time process control system embodying either or both of the aspects set forth above.

An advantageous embodiment for using or distributing the present invention is as software. The software embodiment includes a plurality of processing system instructions that are stored to a conventional storage medium. Preferred storage media include without limitation magnetic, optic and electric, as well as suitably arranged combinations of the same. The processing system instructions are readable and executable by one or more of the above-identified processing systems to emulate, on a non-native computer, a native environment for a visual display object file for a real time process control system and a real time process control system employing the emulator. In alternate embodiments, firmware or hardware may also suitably be used to implement the principles of the present invention.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, and the advantages thereof, reference is now made to the following descriptions taken in conjunction with the accompanying drawings, in which like labels represent like or equivalent objects, and in which:

FIGS. 4A(1) to 4A(3) illustrate three exemplary computer network topologies that provide a suitable environment within which the present invention may be implemented and operated;

FIG. 5 illustrates a conceptual block diagram of an exemplary universal station emulator according to HONEYWELL's TDC 3000 platform;

DETAILED DESCRIPTION

Figure 1:
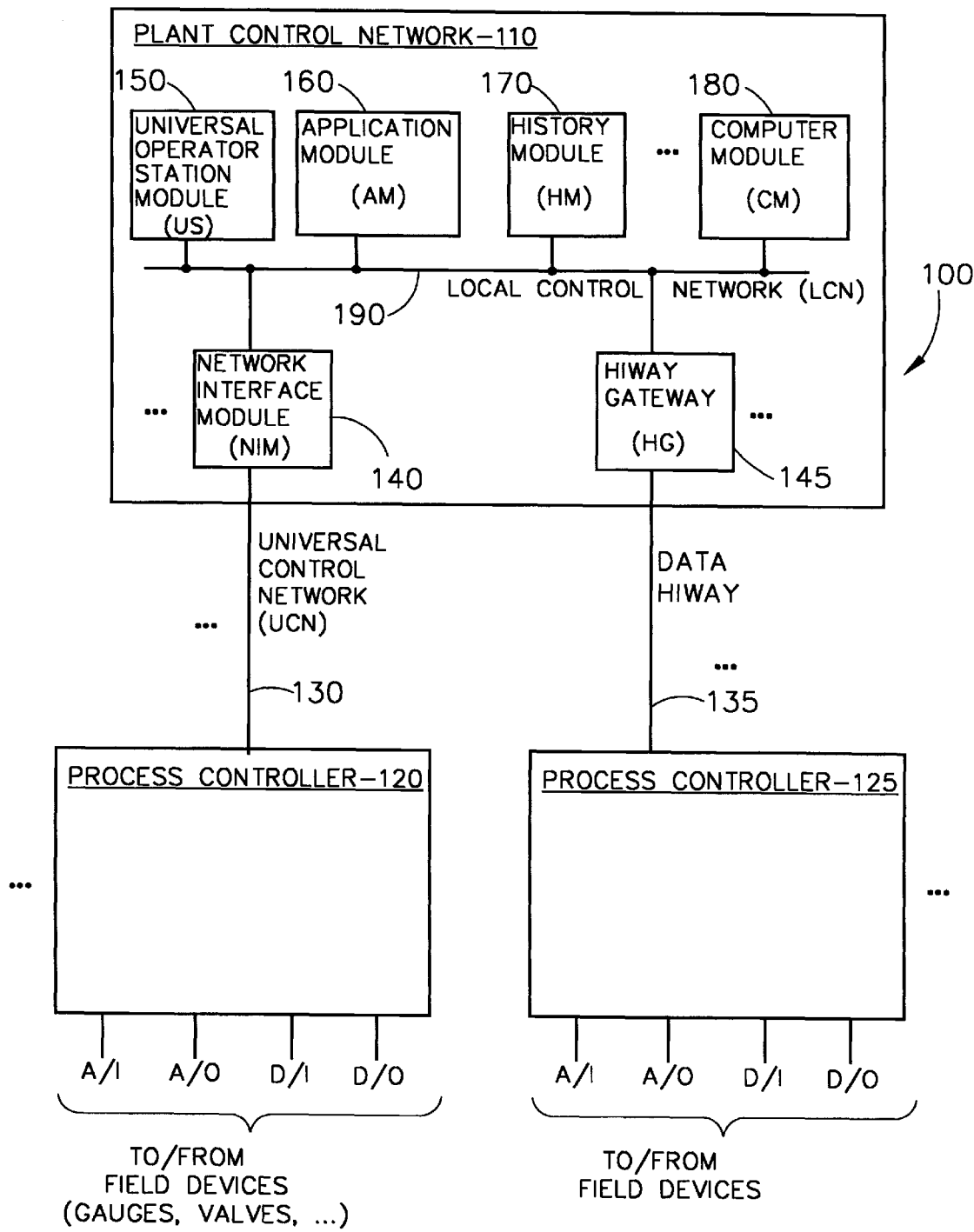
FIG. 1 illustrates a block diagram of a process control system that provides an environment in which the present invention may be used.

Before describing the system and method of the present invention, it will be helpful in understanding a system environment in which the present invention may be used. Accordingly, referring initially to FIG. 1, illustrated is a block diagram of a process control system 100 in which the system and method of the present invention may be found. Process control system 100 includes a plant control network 110 coupled to a plurality of process controllers 120, 125 via a network interface module ("NIM") 140 and highway gateway ("HG") 145 over a universal control network ("UCN") 130 and data highway 135, respectively. Additional process controllers can be operatively connected to plant control network 110, if so desired. Process controllers 120, 125 interface analog input and output signals and digital input and output signals ("A/I," "A/O," "D/I" and "D/O", respectively) to process control system 100 from a variety of field devices (not shown) including valves, pressure switches, pressure gauges, thermocouples or the like.

The terms "include," "includes" and "including," as used herein, mean inclusion without limitation; the phrase "associated with" and any derivatives thereof, as used herein, mean to include within, interconnect with, contain, be contained within, connect to or with, couple to or with, be communicable with, juxtapose, cooperate with, interleave, be a property of, be bound to or with, or the like; and the term "or," as used herein, is inclusive, meaning and/or.

Plant control network 110 provides overall supervision of a controlled process in conjunction with a plant operator (not shown), and obtains all the information needed to perform the supervisory function, and includes an interface with the operator. The plant control network 110 includes a plurality of physical modules including a universal operator station module ("US") 150, an application module ("AM") 160, a history module ("HM") 170, a computer module ("CM") 180 and possibly duplicates of these modules (and additional types of modules, not shown) as necessary to perform the required control/supervisory function of the process being controlled. Each of these physical modules is operatively connected to a local control network ("LCN") 190 that permits each of these modules to communicate with one another as necessary. NIM 140 and HG 145 provide an interface between the LCN 190 and the UCN 130 and data highway 135, respectively.

Each of the physical modules 150, 160, 170, 180 of plant control network 110 includes its own unique functionality. Furthermore, physical modules 150, 160, 170, 180 are peers, or equivalents, of one another with equal access to the communication medium, or LCN 190, of process control system 100 for the purpose of transmitting information therebetween.

US 150 of plant control network 110 is a workstation for one or more plant operators. It includes an operator console that is the interface between the plant operator, or operators, and the process or processes of the plant for which they are responsible. Each US 150 and any backup modules (not shown), for example, is connected to the LCN 190, and all communication between US 150 and any other module (e.g., AM 160, HM 170, NIM 140) of plant control network 110, including any backup modules (not shown) is by means of LCN 190. US 150 has access to data that are on LCN 190 and the resources and data available through, or from, any of the other modules of plant control network 110. Each US 150 includes a visual presentation including, for instance, a conventional display device, that, in turn, includes a video display generator, an operator keyboard, a floppy disk data storage device, trend pen recorders, status displays or the like, for example (not shown).

In an advantageous embodiment of the present invention, the systems and methods of the present invention may be embodied within a non-native computing environment that functions as at least part of US 150. This is discussed in greater detail hereinafter.

Another type of physical module included in plant control network 110 is HM 170 that provides mass data storage capability. Each HM 170 includes at least one conventional disk mass-storage device that provides a large volume of storage capability for binary data. The types of data stored by such mass storage device are typically trend histories or data from which such trends can be determined, data that constitute or form displays, copies of programs for the units of process controllers 120, 125 for the modules (e.g., US 150, AM 160) or for units of the modules of plant control network 110.

Another type of module incorporated into plant control network 110 is AM 160. AM 160 provides additional data processing capability in support of the process control functions performed by process controllers 120, 125, such as data acquisition, alarming, batch history collection and providing continuous control computational facilities when needed. The data processing capability of AM 160 is provided by its module processor and module memory (not shown).

CM 180 may use standard or common units of all physical modules to permit a medium-to-large scale, general-purpose data processing system to communicate with other modules (e.g., US 150, AM 160) of plant control network 110 and the units of such modules over LCN 190 and the units of process controllers 120, 125 via NIM 140 or HG 145, respectively. Data processing systems of CM 180 are used to provide supervision, optimization, generalized user program preparation and execution of such programs in higher-level program languages. Typically, the data processing systems of CM 180 have the capability of communicating with other such systems by a communication processor and communication lines, as is well known in the art. CM 180 may include one of several kinds of computers and operating systems. Honeywell DPS-6 computers, for instance, may be employed in CM 180.

It should be noted, that although the principles of the present invention are disclosed in the emulation on a non-native computer of at least a portion of a native US 150, any module of process control center 100 may also, at least in part, be suitably emulated on a non-native computer facilitating proper functioning of process control system 100. It should further be noted, that use herein of the term "computer" may include a single "standalone" computer, as well as a network of cooperating computers, or a portion of the same.

LCN 190 of the present embodiment may employ a high-speed, bit serial dual redundant communication bus that interconnects all the modules (e.g., US 150, AM 160) of plant control network 110. LCN 190 provides the only data transfer path between the principal sources of data, such as NIM 140, HG 145, AM 160 and HM 170 and the principal users of such data, such as US 150, AM 160 and CM 180. LCN 190 also provides the communication medium over which large blocks of data, such as memory images, may be moved from one module, such as HM 170, to another, such as US 150.

Each of the physical modules (e.g., US 150, AM 160) of plant control network 110 of the present embodiment includes certain, or required, standard units. A more complete description of the plant control network 110 and the physical modules may be had by reference to U.S. Pat. Nos. 4,607,256, 5,333,298 and 5,386,503, each of which is incorporated herein by reference for all purposes.

Figure 2:
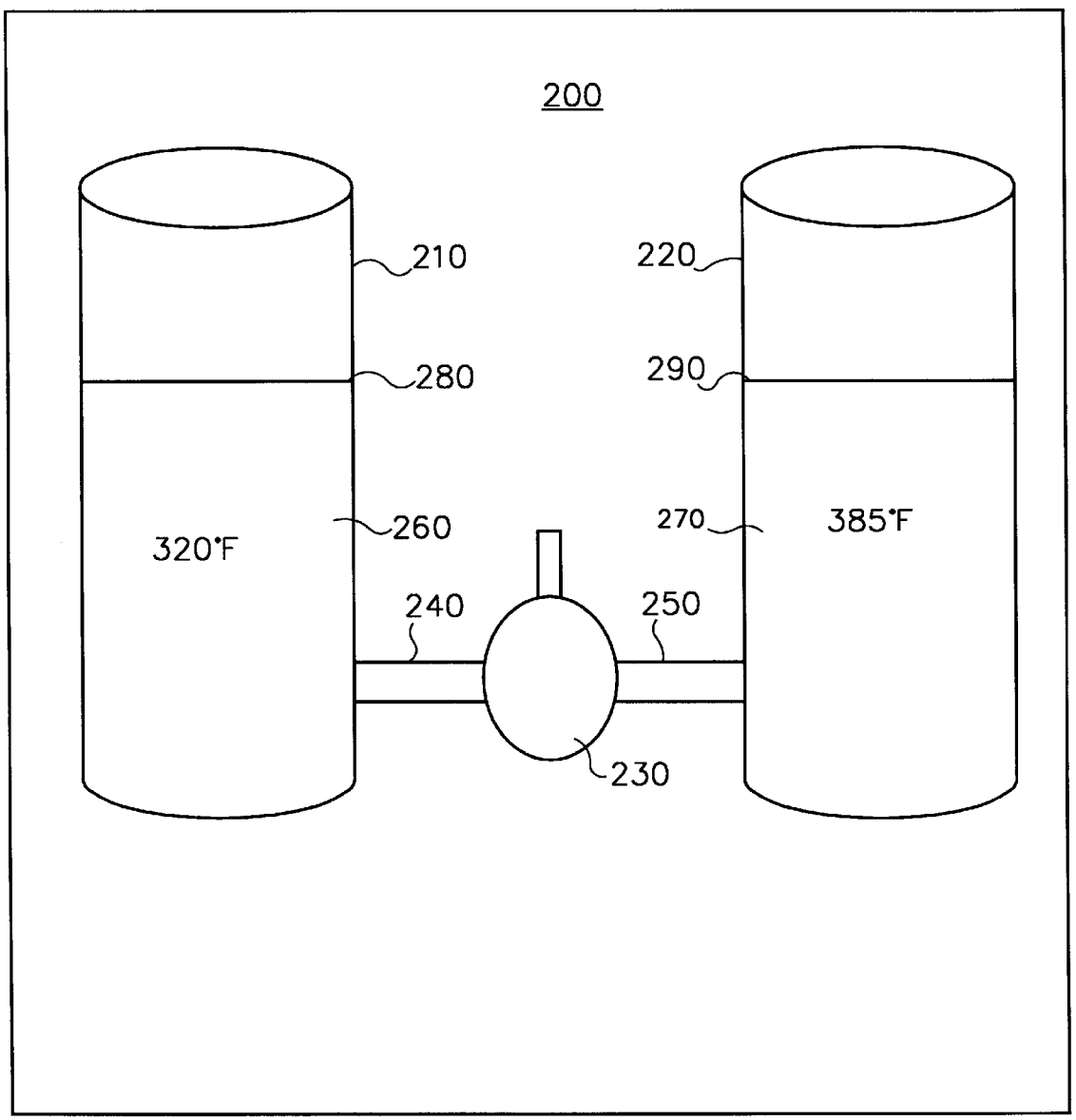
FIG. 2 illustrates an exemplary visual display according to the present invention.

Turning now to FIG. 2, illustrated is an exemplary visual display according to the present invention. The visual display, generally designated 200, graphically conveys a simple chemical process occurring in a plant (not shown) to a user, allowing the user to control the process. Visual display 200 comprises a first graphical element 210, taking the rudimentary form of a vat for containing a liquid, that corresponds to and symbolizes a first vat (not shown) in the plant. Likewise, a second graphical element 220 takes the rudimentary form of a liquid vat and corresponds to and symbolizes a second vat (not shown) in the plant. A third graphical element 230 takes the rudimentary form of a valve for controlling a fluid flow rate and corresponds to and symbolizes a valve (not shown) in the plant. Finally, fourth and fifth graphical elements 240, 250 take the rudimentary form of pipesections and correspond to and symbolize first and second pipesections in the plant that couple the first vat to the valve and the valve to the second vat, respectively.

The simple chemical process may be as follows. A catalyst is contained in the first vat. An exothermic chemical reaction is to take place in the second vat. The process control system 100 of FIG. 1 monitors the temperature of the second vat and controls the valve to adjust the flow of the liquid contained in the first vat from the first vat to the second vat. In this process, if the temperature of the second vat is deemed too low, introduction of the catalyst thereto is increased, thereby increasing heat production and vat temperature. Likewise, if the temperature of the second vat is deemed too high, introduction of the catalyst thereto is decreased, thereby decreasing heat production and vat temperature.

It is important therefore, with respect to this example, that visual display 200 also indicate at least the temperature of the first and second vats. These values are designated 260 and 270, respectively. Further, it is desired to show liquid levels in both the first and second vats to ensure that liquid levels do not deviate from acceptable ranges. These values are designated 280 and 290, respectively.

A visual display generating program exists within plant control system 100 of FIG. 1, and, more particularly, exemplar US 150. As previously described, the program uses a visual display object file structure to generate visual display 200 of FIG. 2. The visual display object file therefore should contain data required to generate visual display 200, including data for generating the first, second, third, fourth and fifth graphical elements 210, 220, 230, 240, 250 and data (address pointers and the like) required to obtain the temperature and liquid level indicators 260, 270, 280, 290. These data are collectively organized within the visual display object file according to a standard structure.

Figure 3A:
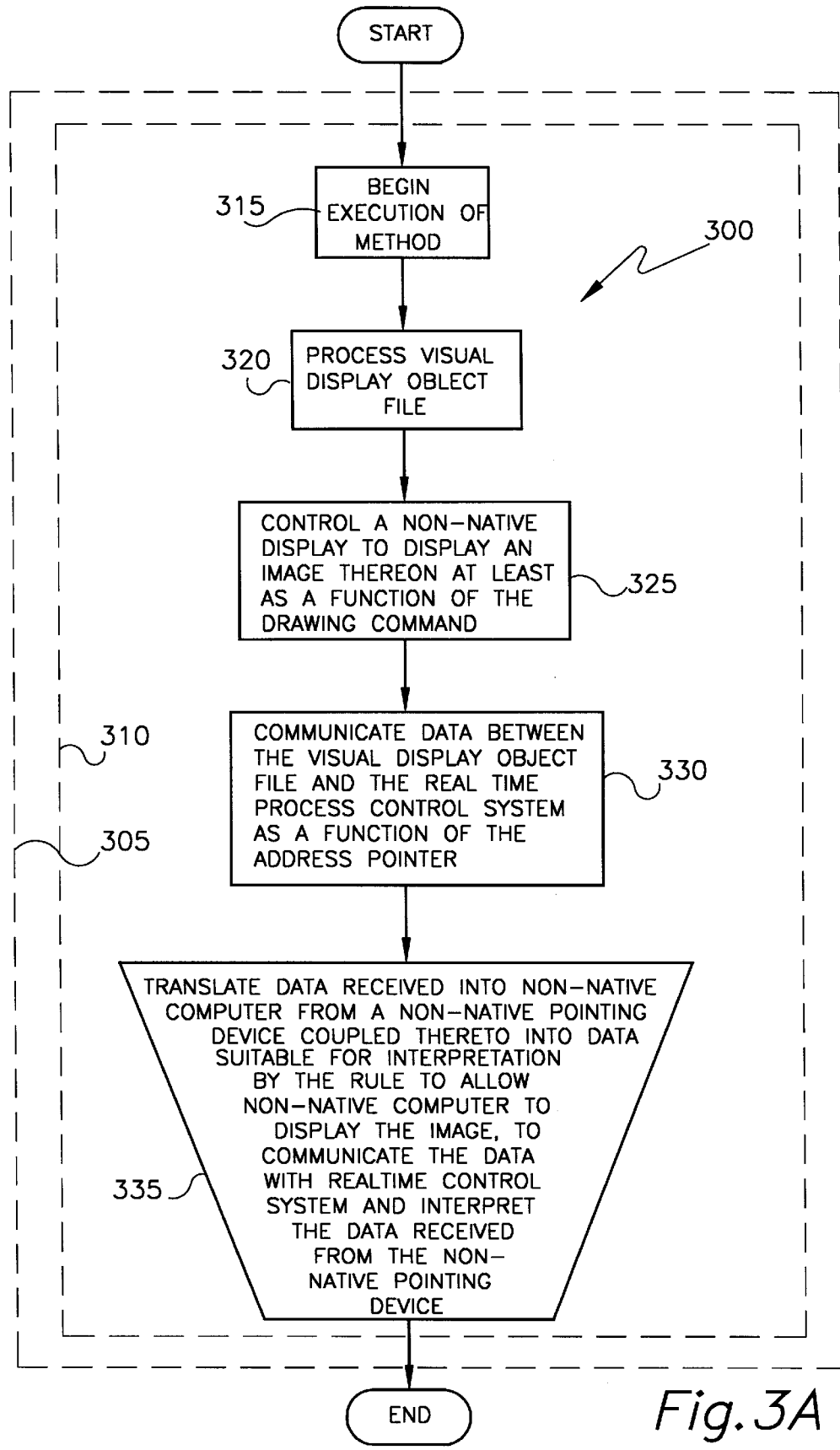
FIG. 3A illustrates a flow diagram of an exemplary method of operating a non-native computer to provide a way of emulating, on the non-native computer, a native environment for a user interface object file for a real time process control system and a real time process control system employing the emulator.

Turning now to FIG. 3A, illustrated is a flow diagram of an exemplary method (generally designated 300) of operating a non-native computer to provide a way of emulating, on the non-native computer, a native environment for a user interface object file, such as a visual display object file, for a real time process control system and a real time process control system employing the emulator, all in accordance with the principles of the present invention.

As stated hereinabove, an advantageous embodiment of the present invention may be implemented in software, although alternate embodiments may suitably be implemented in firmware, hardware or some combination of the three. Exemplary method 300 may therefore be implemented and operated within a conventional computer or processing system (generally designated 305) and, more particularly, in association with conventional processing circuitry (generally designated 310).

For the purposes of illustration, the native environment may be exemplary US 150 of FIG. 1 and the user interface object file may be a visual display object file associated with the same. The visual display object file may be created locally by non-native computer 305, received from LCN 190 or some combination thereof. The visual display object file includes data necessary to produce, at least in part, a native computer display, and may be advantageously associated with a drawing command, an address pointer for communicating data with the real time process control system, such as process control system 100 of FIG. 1, and a rule for interpreting data received from a touch-sensitive screen of a suitable-conventional display device.

To begin, a user "boots-up" non-native computer 305, preferably causing execution of method 300 (process step 315) (the booting process of an advantageous embodiment is described in greater detail hereinafter). It should be noted that non-native computer 300 replaces convention US 150 in, and is associated with, the bulk of process control system 10. Processing circuitry 310, executing method 300, initiates processing of the visual display object file (process step 320). Non-native computer 305 may suitably be one or more microprocessor-based computers, although mainframes or other types of computers may also be suitable. Non-native computer 305 may be associated with process control system 10 through application specific circuitry that is used to interface non-native computer with LCN 190. An advantageous embodiment of this circuitry is an LCN processor board ("LCNP") which is the subject of U.S. patent application Ser. Nos. 08/727,724 and 08/727,725, filed concurrently herewith, and respectively entitled "Improved UOS Module for a Distributed Process Control System" and "Control Circuit," which were previously incorporated herein by reference for all purposes.

Exemplary method 300 includes a display routine that operates to cause non-native computer 305 to control a conventional non-native visual display coupled thereto to display an image thereon at least as a function of the drawing command (process step 325). According to the illustrated embodiment, the drawing command may be directed to a whole-screen visual display and the non-native visual display is a windowed display. Windowed visual displays and their advantages in conveying information to an operator in a flexible and intuitively understandable manner are well known. This embodiment allows the visual display, which has heretofore been constrained to occupy the entirety of the visual display, to fit within a window thereby freeing the remainder of the visual display for use by other routines and allowing the window to be reduced to an icon, resized, occluded or the like as the operator desires.

Exemplary method 300 includes an address mapping routine that operates to cause non-native computer 305 to communicate the data between the visual display object file and real time process control system 100 as a function of the address pointer (process step 330). According to the illustrated embodiment, the address pointer may suitably correspond to a physical address in real time process control system 100. Conventionally, the address pointer maps directly onto elements (such as sensors, controllable devices, etc.) of real time process control system 100. However, those skilled in the art will understand that simple or complex address translation schemes may be advantageously employed to allow the address pointer to assume a more flexible role in addressing the elements.

According to advantageous embodiments, the address mapping routine allows bidirectional communication of data between the visual display object file and real time process control system 100, thereby allowing data to be both written to and read from the elements of real time process control system 100. The illustrated embodiment may also support unidirectional data communication.

Exemplary method 300 includes a input translation routine that operates to translate data received into non-native computer 305 from a non-native pointing device coupled thereto into data suitable for interpretation by the rule to thereby allow non-native computer 305 to display the image, communicate the data with real time process control system 100 and interpret the data received from the non-native pointing device (process step 335). According to the illustrated embodiment, the non-native pointing device may be a mouse, trackball, trackpad, joystick, a non-native touch-sensitive screen or the like.

Advantageously, non-native computer 305 may be associated with a multitasking operating system. The multitasking operating system advantageously provides for concurrent task execution, allowing an operator to employ the non-native computer to monitor and control the plant associated with process control system 100, while performing another task, such as writing a memorandum, scheduling a meeting, sending e-mail, backing up historical data concerning the operation of real time process control system 100 or the like.

The multitasking operating system may be a WINDOWS® NT® operating system (commercially available from MICROSOFT CORPORATION of Redmond, Wash.) executing on non-native computer 305 and providing a channel therethrough for communicating the data between the visual display object file and real time process control system 100. Other advantageous embodiments may use alternate multitasking operating systems, such as OS/2®, System7®, UNIX®, DOS or the like.

The illustrated embodiment introduces a way of emulating an environment for a user interface object file, such as the exemplary visual display object file, that frees the owner of having to redesign the same to function on a non-native computer. As described above, user interface object file redesign is time-consuming and expensive and may result in unintended, undetectable, but nonetheless crucial, discrepancies between the original and redesigned user interface object files. These discrepancies may introduce subtle, potentially detrimental, changes in the operation of the plant being controlled.

An important aspect of the present invention, as will be discussed in greater detail hereinafter, the drawing command, address pointer and rule may be embodied in separate objects within the visual display object file. Those skilled in the art are familiar with the concepts behind, and advantages of, object-oriented programming. The present invention can make advantageous use of objects in the visual display object file. However, the broad scope of the present invention includes other programming paradigms, such as procedures (the original paradigm), declarations (such as employed in expert systems) and the like.

Figure 3B:
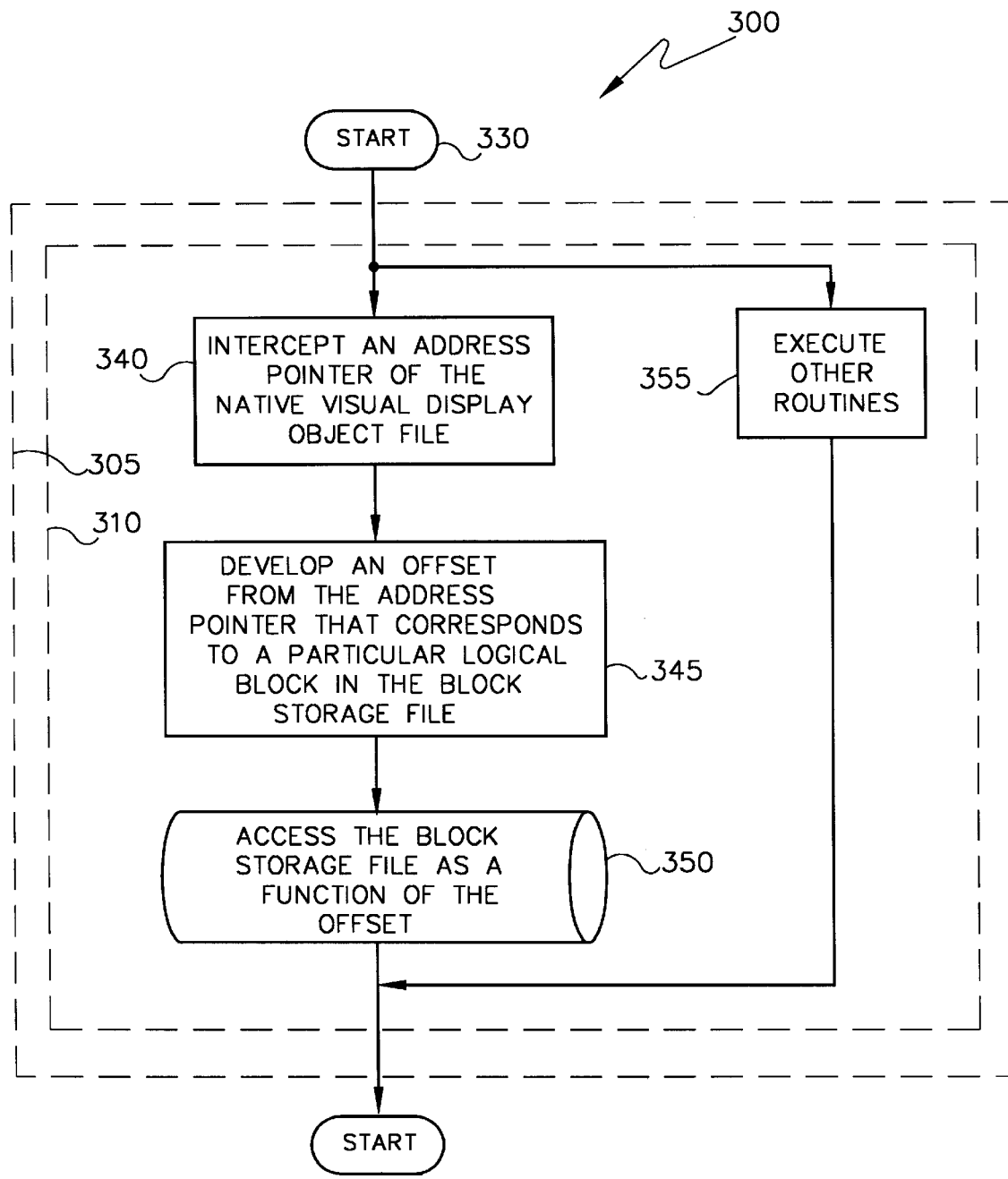
FIG. 3B illustrates a flow diagram of an exemplary method of operating the non-native computer of FIG. 3A to provide a way of emulating, on the non-native computer, a native removable-media mass storage device in accordance with the principles of the present invention.

Turning now to FIG. 3B, illustrated is a flow diagram of an exemplary method (generally designated 303) of operating non-native computer 305 to provide a way of emulating, on non-native computer 305, a native removable-media mass storage device, the emulator cooperating with the address mapping routine (START step 330) to provide communication of the data between the visual display object file and real time process control system 100 in accordance with the principles of the present invention. This aspect of the illustrated embodiment allows a hardware device associated with the native environment (namely, a particular type of mass storage device such as a native Bernoulli® drive) to be wholly emulated in software. This allows the non-native computer to be divorced from the conventional mini- or mainframe computer hardware as much as possible.

Again, the illustrated embodiment of the present invention is implemented in software. Exemplary method 303 is therefore implemented and operated within non-native computer 305 and, more particularly, in association with processing circuitry 310.

In a non-native, multitasking operating system, non-native computer 305 stores a block storage file on a non-native mass storage device, such as a floppy or hard disk drive or an optical, magneto-optical or tape drive, or even a non-native Bernoulli® drive, as examples. To begin emulation of the mass storage device, the address mapping routine, in association with the block storage file, causes computer 305 to intercept an address pointer of the native visual display object file (process step 340).

Computer 305 develops an offset from the address pointer that corresponds to a particular logical block in the block storage file (process step 345). The block storage file advantageously includes a structure compatible with the non-native, multitasking operating system and containing the logical blocks. Of course in alternate embodiments, there may be a plurality of block storage files, and the address pointer may correspond to a particular logical block in a second, third, etc. block storage file.

Computer 305 accesses the block storage file as a function of the offset (online storage step 350). The address mapping routine therefore cooperates with the block storage file and intercedes between the native visual display object file and real time process control system 100 to allow communication of data therebetween as a function of the address pointer in the native visual display object file. The address mapping routine develops the offset from the address pointer that corresponds to a particular logical block in the block storage file to thereby substitutable for the mass storage device without requiring modifications to the visual display object file.

The illustrated embodiment introduces a mass storage device emulator that eliminates a need actually to drive the mass storage device with the non-native operating system. By emulating the mass storage device in software, the non-native operating system is afforded great flexibility in the ways in which it can manage the logical blocks therein.

It is important to note that exemplary non-native computer 305 may be suitably operative in association with the multitasking operating system to execute other routines in the multitasking operating system which may be capable of using the block storage file concurrently with the address mapping routine (process step 355). While not necessary to the broad scope of the present invention, concurrent use allows for data replication and backup, plant-status reporting or the like.

In accordance with a preferred embodiment to be discussed hereinafter, the particular logical block is 256 bytes in length, although the present invention includes fixed logical block lengths of other than 256 bytes and variable logical block lengths, as suitable to a given application. It should be noted that the block storage file of the illustrated embodiment may be stored on a single physical disk drive or span more than one physical disk drive.

If the exemplary emulator includes more than one block storage file, the address mapping routine being capable of alternatively cooperating with the second block storage file to intercede between the native visual display object file and real time process control system 100 to allow communication of the data therebetween. This embodiment allows multiple block storage files to be used which may be advantageous when modifying real time plant control system 100 or when controlling multiple of such systems.

Turning now FIGS. 4A(1) to 4A(3), illustrated are three exemplary computer network topologies 305 that provide a suitable non-native computer environment within which the present invention may suitably be implemented and operated. More particularly, FIG. 4A(1) illustrates a conventional bus topology; FIG. 4A(2) illustrates a conventional ring topology; and FIG. 4A(3) illustrates a conventional star topology, all of which are well known in the art. Alternate network topologies are also well known in the art, as well as suitable combinations of the same.

Figure 4B:
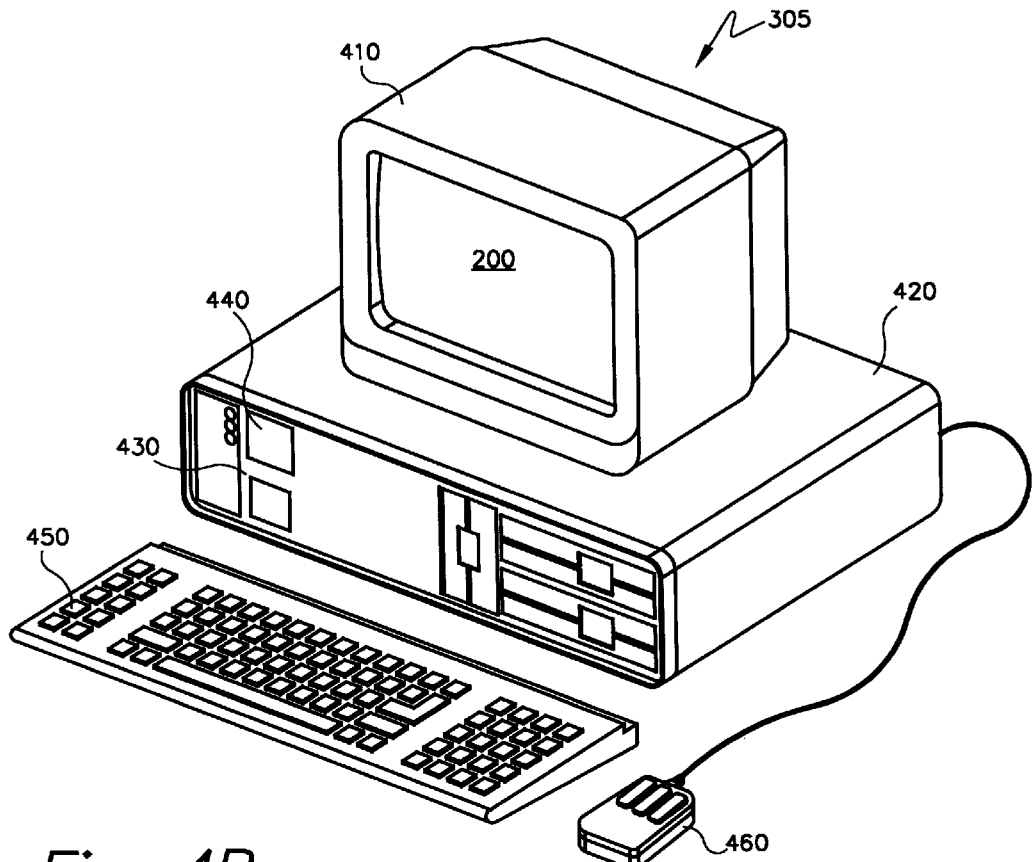
FIG. 4B illustrates an isometric view of a conventional computer that provides an environment within which the present invention may suitably be implemented and operated.

Turning now FIG. 4B, illustrated is an isometric view of a conventional computer 305, a personal computer ("PC") such as the POWERPC, for example, that provides an exemplary non-native computer environment within which the present invention may suitably be implemented and operated. Since the present invention is not limited to application in a personal computing environment, FIG. 4B is illustrative only.

Exemplary PC 305 includes a display device or monitor 410, a main chassis 420, within which are various electronic components (discussed with reference to FIG. 4C), and a plurality of exemplary conventional user interfaces, including a keyboard 450 and a mouse 460.

Display device 410, keyboard 450 and mouse 460 cooperate to allow communication between PC 305 and a user (not shown). Main chassis 420 illustratively includes a dedicated hardware reset switch 430 (adapted to trigger hardware reset circuitry (not shown) within main chassis 420 to reboot or restart PC 305 when the user depresses reset switch 430) and a power switch 440 (capable of interrupting and restoring power to PC 305). Interruption and restoration of power brings about a restart of PC 305.

Display device 410 provides area 200 for display of graphical data under the control of a conventional graphical user interface ("GUI") operating system (not shown) executing within PC 305. The GUI operating system manages division of computer resources among various application tasks executing on PC 305, such as exemplary emulation methods 300 and 303. The GUI operating system is operative to divide area 200 of display device 410 into a plurality of suitably arranged windows that display data corresponding to each of the application tasks. Each window may suitably be allowed to occupy a portion or an entirety of area 200 presented on display device 410, depending on the user's wishes. Various ones of the windows may suitably occlude one another, whether in whole or in part.

While non-native computer 305 has been illustrated generally using exemplary networks 305 and PC 305, it should be noted that the principles of the pre sent invention may be implemented and used with any suitably arranged computer system for emulating, on non-native computer 305, a native environment for a user interface object file for a real time process control system, including laptop/notebook, mini, main frame and super computers, as well as networks of computers, such as local-area, metropolitan-area and wide-area networks, as examples.

Figure 4C:
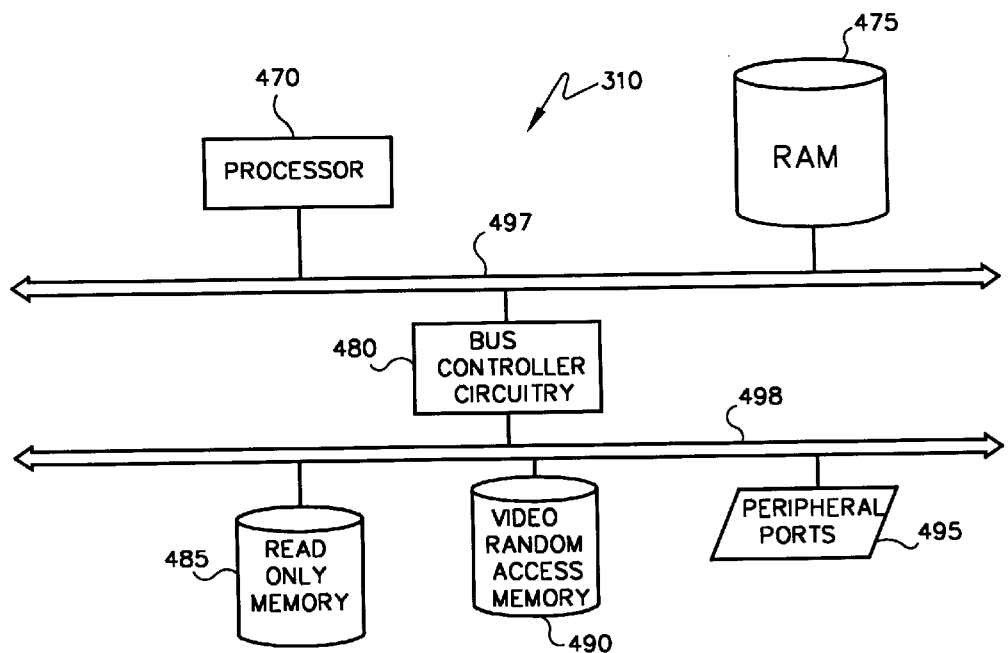
FIG. 4C illustrates a high-level block diagram of exemplary processing circuitry that may suitably be associated with the computer FIG. 4B to provide an environment within which the present invention may suitably be implemented and operated.

Turning to FIG. 4C, illustrated is a high-level block diagram of exemplary processing circuitry (generally designated 310) that may suitably be associated with a computer, such as PC 305, to provide a non-native environment within which the present invention may suitably be implemented and operated. Processing circuitry 310 illustratively includes a processor 470, a conventional random access memory ("RAM") 475, bus controller circuitry 480, a conventional read-only memory ("ROM") 485, a conventional video random access memory ("VRAM") 490 and a set of peripheral ports 495. An exemplary host bus 497 is shown and is suitably operative to associate processor 470, RAM 475 and bus controller circuitry 480. An exemplary input/output ("I/O") bus 498 is shown and is operative to associate bus controller circuitry 480, ROM 485, VRAM 490 and the set of peripheral ports 495. The set of peripheral ports 495 may suitably couple I/O bus 498 to any one or more of a plurality of conventional suitably arranged peripheral devices for communication therewith. Included among the set of peripheral ports 495 may suitably be one or more serial or parallel ports, such as a conventional PCI slot. In point of fact, a preferred embodiment discussed next uses the PCI slot to associate computer 305 with the process control system through application specific circuitry, LCNP, disclosed in U.S. patent application Ser. Nos. 08/727,724 and 08/727,725 which have been previously incorporated herein by reference for all purposes.

Bus controller circuitry 480 provides suitable means by which host bus 497 and I/O bus 498 may be associated, thereby providing a path and management for communication therebetween. Each of the illustrated buses 497 and 498 requires a drive current to carry signals thereon. The illustrative circuit accordingly operates in conjunction with a conventional system controller (not shown) that supplies the required drive current. Of course, the illustrative circuitry may also suitably be implemented having only a single bus or more than three buses.

According to the illustrated embodiment, exemplary RAM 475 may suitably be adapted, at least in part, for storing tasks for execution by processor 470. Processor 470 is operative upon execution of one or more the stored tasks to access exemplary VRAM 490 to display data in area 200 of display device 410. As stated hereinabove, one or more of those tasks may suitably embody the principles of the present invention to emulate a native environment for a user interface object file for a real time process control system.

In alternate advantageous embodiments, processing circuitry 310, as well as the application specific circuitry using peripheral ports 495, in whole or in part, may be replaced by, or combined with, any suitable processing configuration, including programmable logic devices, such as programmable array logic ("PALs") and programmable logic arrays ("PLAs"), digital signal processors ("DSPs"), field programmable gate arrays ("FPGAs"), application specific integrated circuits ("ASICs"), large scale integrated circuits ("LSIs"), very large scale integrated circuits ("VLSIs") or the like, to form the various types of circuitry described and claimed herein.

Conventional processing system architecture is more fully discussed in *Computer Organization and Architecture,* by William Stallings, MacMillan Publishing Co. (3rd ed. 1993); conventional processing system network design is more fully discussed in *Data Network Design,* by Darren L. Spohn, McGraw-Hill, Inc. (1993); and conventional data communications is more fully discussed in *Data Communications Principles,* by R. D. Gitlin, J. F. Hayes and S. B. Weinstein, Plenum Press (1992) and in *The Irwin Handbook of Telecommunications,* by James Harry Green, Irwin Professional Publishing (2nd ed. 1992). Each of the foregoing publications is incorporated herein by reference for all purposes.

Before undertaking a discussion of a preferred embodiment of the present invention that is associated with HONEYWELL's TDC 3000 platform of real time process control systems, the meaning of the following terms should be understood: a "native window" may mean any function of providing a standard TDC Universal Station (US 150 of FIG. 1) display within a conventional NT® WINDOW®—wherein functionality supports display, selection and input actions; "emulator" may mean software running within the non-native NT® environment which functions in lieu of physical hardware present in conventional, or classic, US 150—examples of devices "emulated" are video, touch screen, keyboard, disk, etc.; "Daemon" may mean software running within the non-native NT® environment that provides mid-level interfacing to conventional TDC memory for high-level applications and therefore may refer to software interface programs ported from a conventional UXS environment; "PCI" means a conventional logical bus protocol used on the backplane of "PCI Bus" computers 305; "LCNA," which is synonymous with LCNP, may mean a Local Control Network Adapter board that operates to run TDC software when plugged into a PCI slot of a suitable NT® station 305 (application specific circuitry, LCNP, disclosed in U.S. patent application Ser. Nos. 08/727,724 and 08/727,725); "UntS" means a WINDOWS® NT® based computer system 305 which provides US 150 functionality; "SCSI" means small computer system interface (ANSI standard X3.131-1986) defining a peripheral bus and command set for interfacing peripherals such as disks, tapes, CD drives, etc.; "work station interface" ("WSI") may mean a custom board interface between a TDC and a workstation (NT® according to the present case) where shared memory is used to realize a high-speed, mailbox-oriented messaging interface; and "Client Area" may refer to that region 200 within an NT® WINDOW® exclusive of scroll bars, title bar, menu area, tool bar, control buttons, status area or the like.

The design concepts of the TDC 3000 platform embodiment comprise a GUS Native Window function that provides an emulation of the TDC hardware environment required by US 150, such that they will operate in a PCI-attached LCNP board which supplies standard TDC processor and LCN 190 hardware equivalents—the remaining hardware conventionally present (i.e., keyboard, touch screen, video display, SCSI disk, ASPI printer, etc) will be emulated by software of the NT® environment and meeting the following two criteria—conventional TDC software (1) may successfully execute, and (2) may be operable from NT® in largely familiar ways to the conventional TDC operator. It is therefore desirable that the emulation minimally changes the conventional TDC software.

Turning now to FIG. 5, illustrated is a conceptual block diagram of an exemplary US 150 emulator which is associated with non-native computer 305 according to the TDC 3000 platform of the present embodiment. An object of this embodiment is to provide a TDC 3000 platform generated US 150 display 200 within an application window of a WINDOWS® NT® environment—a "Native Window." Support for interaction in this window is provided with the intent of allowing an operator to operate US 150 in substantially the same way as is conventionally accomplished—displays are substantially identical, metaphors are largely unchanged, navigation through process control system 100 is familiar, etc.

Another object of this embodiment is to provide a TDC 3000 platform generated US 150 access to other functions of the WINDOWS® NT® environment, such as Multiple Schematics, etc. This is intended to support both the Native Window needs and application needs with a single common support mechanism.

Exemplary non-native computer 305 illustrates a layered architecture that conceptually separates the conventional GUS environment into four exemplary layers, namely, an application layer, an environment layer, a Device Interface layer and a physical layer. The application layer includes multiple schematics and other higher-level functions. The environment layer includes a plurality of emulators (e.g., native windows) and application servers and daemons (which provide data access to TDC targets for application-layer functions). The Device Interface Layer layer includes WINDOW® NT® driver support the provides memory and exception-processing access to TDC 3000 platform targets via the PCI bus. The physical layer includes a TDC 3000 environment compatible computer card which provides execution of existing TDC software.

For purposes of discussion, it is advantageous to explore a number of scenarios, or interactions, between a user, non-native computer 305 and the TDC 3000 platform.

User Powers "ON" Windows® NT® Non-native Computer Associated with the TDC 3000 Process Control System Assume that non-native computer 300, presently powered-off, is powered-on. The WINDOWS® NT® operating system begins to bootstrap and startup, including initialization of conventional TDC 3000 platform GUS support services, and the LCNP board (application specific circuitry, disclosed in U.S. patent application Ser. Nos. (Attorney Docket No. I2000151) and (Attorney Docket No. I2000152)) begins a power-on initialization sequence.

WINDOWS® NT® non-native computer 305 holds TDC 3000 platform in reset. WINDOWS® NT® Emulator Service is started. A Common Board Response ("CBR") system is started, and which connects to the PCI driver (a connection for SCSI and a connection for Peripheral Display Generator ("PDG")). CBR starts certain emulators, completes initialization and clears any "RESET" indicia on the LCNP, thereby allowing LCNP to proceed through its boot process.

User Powers "DOWN" and Restarts Windows® NT® Non-native Computer Associated with the TDC 3000 Process Control System The WINDOWS® NT® system gives the user a "severe" warning that this action will terminate operations in the LCNP board. If the user still desires to do reboot, a BOARD RESET is sent to the LCNP by CBR software prior to shutting down the service. The WINDOWS® NT® system performs its normal shutdown and optional restart. If restart is selected, the sequence defined above is entered.

User Powers "DOWN" TDC 3000 Process Control System and Optionally Reboots Running TDC 3000 Process Control System If a shutdown in the native window occurs, the shutdown is initiated by the TDC and the WINDOWS® NT® has no advance knowledge of the event. The TDC signals WINDOWS® NT®, and WINDOWS® NT® need not terminate the Native Window application or the Emulator Service, anticipating a possible reboot of the TDC system.

If a shutdown request comes about via an application program in WINDOWS® NT®, the LCNP will be sent a "SHUTDOWN" message that will cause the TDC to re-enter the firmware and await a load request.

User Uses a Pointing Device to "Touch" or Actually Touches the Screen

If the user clicks the mouse on the WINDOWS® NT® screen then the emulator sends a cursor-positioning command to the TDC. As the cursor moves across the screen, it changes shape to reflect whether or not it is over a target. If a "click" event appears over a target, the TDC responds as normal, bringing up a new screen or other data, as appropriate.

If the user touches, or clicks, on the client area of the Native Window, two events are passed to the TDC: (1) a cursor move event to the location touched and (2) a pick event at the same location.

The TDC responds according to the present contents of the Native Window. The response is communicated to the Native Window via commands which update the image displayed.

User Types Key

In WINDOWS® NT®, only one window has input focus at any given instant. The window which has input focus receives keyboard events. As such, the Native Window application responds to keyboard activity when it has input focus. When a keystroke occurs while the Native Window has input focus, the keystroke is converted to an appropriate TDC keycode according to the type of keyboard in use. This converted keycode is communicated to the TDC. The TDC responds in exactly the same manner as if the keystroke was entered on a corresponding keyboard attached to a conventional Universal Station keyboard.

For instance, TDC performs whatever action is called for or configured for the button pressed. TDC sends appropriate commands which are used to update the Native Window appropriately.

Keystrokes occurring while the cursor resides in a conventional TIP filed result in additional processing. The appropriate keycode is communicated to TDC whether the cursor resides in a TIP or not. However, when in a TIP, TDC communicates TIP processing commands to the emulator. The mechanics of TIP processing are more complex than standard screen updates. Standard TDC drawing commands contain all of the information required to process the command. For instance, a draw text command contains the text to draw and the screen coordinates to draw at. However, the commands sent by TDC to echo characters into a TIP do not indicate where the characters go. The emulator must read data from a conventional TIP Context Array maintained by the TDC. The emulator must also maintain a screen image table (stored on the TDC) indicating all of the TIP text on the screen. TIP processing commands such as Echo Character, Erase Character, Erase Line, Copy Line, etc., are sent by the TDC. The emulator determine which TIP the cursor is in and perform the appropriate text editing functions and update the screen appropriately.

Emulator Start Up

WINDOWS® NT® starts a software PCI driver early in startup, based on WINDOWS® NT® Registry entries. During the WINDOWS® NT® startup sequence, a WINDOWS® NT® service called "Emulator Service" is automatically started. The main program of this service first initializes its internal database to "empty" and then reads configuration information indicating which emulators are needed.

According to the illustrated embodiment, for each LCNP present, WINDOWS® NT® will start at least three CBR threads (one for SCSI, one for PDG, one for WSI2).

The WSI, SCSI and PDG CBR threads start their respective peripheral emulators (keyboard, video, etc.), and then enter a loop waiting for the driver to report TDC writes to I/O space, including commands.

Emulators threads register themselves with CBR threads as being interested in particular slot address ranges. They then enter an endless loop waiting for notification of work to do.

Draw Commands Issued by the TDC

Draw commands are stored in buffers of "display list" instructions being aggregated for transmission to PDG. They are handed to the PDG via a buffer associated with an I/O control Buffer ("IOCB"), whose processing is initiated with a START COMMAND to the PDG board.

On the WINDOWS® NT® side, the issuance of the START COMMAND generates an interrupt to the PCI driver. It determines the address written (command register of the associated slot, in this case), and reads the command register contents (i.e., the command). Detecting that this is a command register write, it may determine the address of the first IOCB. It then determines which CBR threads are interested in this command, and "completes" their outstanding read requests.

According to the illustrated embodiment, a PDGThread is the receiver of the notification, and upon waking, determines which individual emulator threads are interested in handling this event, and each of them is awakened—in the present situation, the VideoEmulator thread.

When the video emulator thread wakes and finds the address associated with the START COMMAND generated by the TDC, it uses several CBR library routines, which may be implemented as objects, to access the IOCBs and associated buffers that are the subject of this command. The video emulator processes each of the buffers, extracting display list commands and performing the associated drawing primitive, as necessary. The draw primitives update the Native Window of WINDOWS® NT®. When the buffer has the necessary draw commands, the CBR is notified that the buffer is completely processed. The CB in turn echoes the IOCB status back to the TDC and generates any required interrupts, signaling the completion of the drawing task.

Certain commands, such as exemplary DrawText and DrawLine commands, result in changes to the visible screen. Others change visually perceivable characteristics (e.g., blink, color, etc.) impacting subsequent commands.

TDC Causes a Write To Disk

Writes from the TDC are issued at a "logical sector" on a designated device. The write request from the TDC results in a SCSI IOCB with a write command being built, followed by the issuance of a START COMMAND to the SCSI slot. The write generates an interrupt to the WINDOWS® NT® system. The WINDOWS® NT® system responds to the interrupt, notes the START COMMAND, and indicates that the command is accepted.

The buffer is written to a record in a WINDOWS® NT® file system file whose name is determined from the unit number in the IOCB. The particular 256 byte record in the file to be written is the logical sector specified in the request.

The file may or may not exist, corresponding to the device being mounted or not. A WINDOWS® NT® utility allows users to "mount" and unmount "disks" (expressed as WINDOWS® NT® files) which regardless of their mount status may remain physically on WINDOWS® NT® disk (or accessible via networking). If the file does not exist, an error is returned to the TDC. If the file does exist and is mounted, the write may occur.

The write is a 256 byte write to the record specified by the logical sector number specified in the SCSI request. The file may or may not be long enough to contain this record. If it is not, and the request is not for a sector beyond the preconfigured maximum length of the "disk", then the file is extended out to the necessary length and the sector is written.

Upon completion of the action, return is to CBR which updates the IOCB status to show results of the operation, and generates an IOCB interrupt if required by the particular IOCB.

Note that according to the illustrated embodiment, multiple contiguous 256 byte blocks may be written in response to a single write command, the number of sectors specified in the associated ICOB. Further, in alternate embodiments, the 256 byte value may suitably be altered.

TDC Causes a Read from Disk

A TDC Read command and a Write command are very similar, the differences however are: (1) the buffer area for the read need not be transferred over to the WINDOWS® NT® side—instead, data read from the WINDOWS® NT® disk file is transferred back to TDC memory; and (2) if the Read is requested from a sector that is beyond the current length of the file (but is within the legal preconfigured maximum length of the disk), then a dummy record full of all zeroes is returned, but the file is not extended to this length.

Note similarly that according to the illustrated embodiment, multiple contiguous 256 byte blocks may be read in response to a single read command, the number of sectors specified in the associated ICOB. Further, in alternate embodiments, the 256 byte value may again suitably be altered.

TDC Causes a Print-Screen

A Print-Screen request is intercepted by the videoprinter emulator, recognized as a screen print, causing the I/O stream to the printer (e.g., the screen-print characters) to be discarded in leu of a Native Window screen captured as a bitmap and sent to the printer via a conventional Windows® NT® print common dialog box.

TDC Causes a Print Document

Characters taken from the output buffer of the print command are interpreted from ASPI into equivalent WINDOWS® NT® characters, when possible, (1) text characters are mapped from TDC to WINDOWS® NT® format and "painted" on the printer rendering surface; (2) carriage movement commands are mapped into WINDOWS® NT® graphic commands for moving on the rendering surface; and (3) the current page is transmitted to the printer, resetting the current position to the upper left corner of a new, blank, page-sized rendering surface.

Logical Design—Top Level

Figure 6:
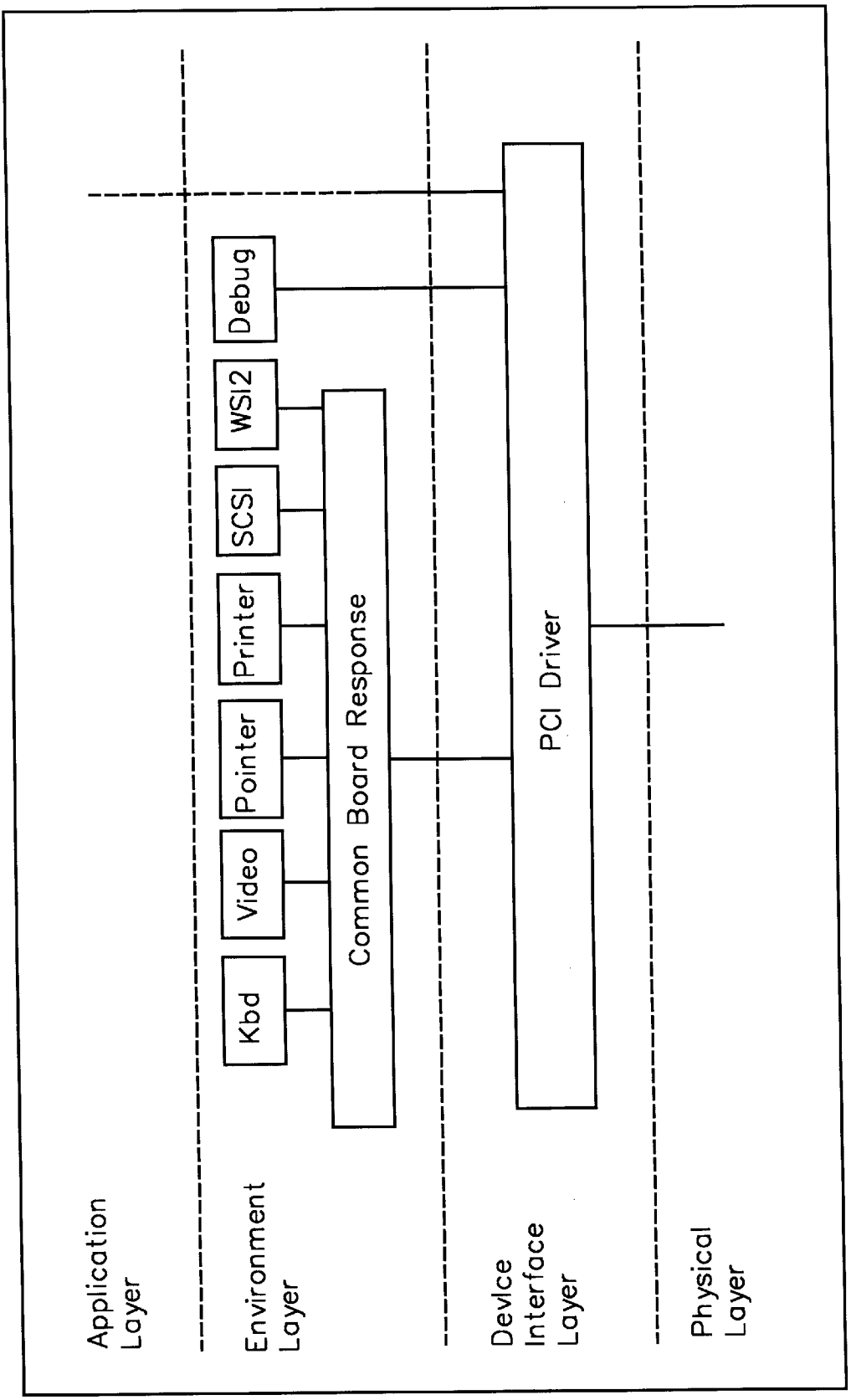
FIG. 6 illustrates a conceptual block diagram of exemplary environmental and Device Interface layers of the universal station emulator of FIG. 5 according to the TDC 3000 platform of the present embodiment.

Turning now to FIG. 6, illustrated is a conceptual block diagram of exemplary environmental and Device Interface layers of the US 150 emulator of FIG. 5 according to the TDC 3000 platform of the present embodiment. The global emulator task is broken down into the following three layered subsystems: (1) PCI Driver; (2) Common Board Response; (3) Video Emulator; (4) Keyboard Emulator; (5) Pointer Emulator; (6) Printer Emulator; (7) SCSI Disk Emulator; (8) Debug Port Emulator; and (9) WSI2 Emulator, each of which are discussed separately hereinbelow.

It should be noted first, however, that the bottom layer and subsystem is the PCI driver which is an actual WINDOWS® NT® driver that is associated with the TDC over the PCI bus of non-native computer 305. It provides support both for the device emulators comprising the Native Window as well as the Application Layer functions that reside in the Application layer. The middle layer is the Common Board Response, which emulates conventional TDC module bus board functions common to all boards (knowledge of commands, slot addressing, IOCBs, etc.). The top layer consists of six independent device emulators: keyboard, video, pointer, SCSI, printer, Work Station Interface ("WSI"), and debug port. These emulators provide the actual "application functioning" that ultimately services each of the emulated devices in accord with conventional TDC architecture.

Design of PCI Driver

Exemplary PCI Driver is divided into two subsystems: (1) solicited target access; and (2) unsolicited target access. Solicited target access manages those interactions between the environment layer and the physical layer that are initiated by the environment layer. These are memory accesses (both read and write) requested by the various emulators of the environment layer. Unsolicited target access manages those interactions between the environment layer and the physical layer that are initiated by the physical layer (i.e., TDC), such as slot address writes by the TDC.

There are two databases in the PCI Driver: (1) slot memory cache; and (2) interrupt receiver registry. The slot memory cache database reflects the entirety of slot memory which exists on the LCNP in lieu of actual slot memory which would normally have been supplied by the LCNP boards. This database is read by and written to WINDOWS® NT® applications and (indirectly) written to by TDC (via unsolicited target access). The interrupt receiver registry database records which WINDOWS® NT® tasks are interested in being notified of writes to particular slot addresses.

At the bottom, the PCI driver interacts with TDC targets via four general mechanisms: (1) reads and writes to TDC module memory locations; (2) writes to TDC I/O space locations; (3) writes to the interrupt-triggering mechanism aboard the LCNP board; and (4) writes to the adapter-command mechanism aboard the LCNP board. At the top, the PCI driver interacts with environment layer entities via two super-classes of mechanisms: (1) solicited target access which are interfaces that support the WINDOWS® NT®- initiated interactions; and (2) unsolicited target access which are interfaces that support TDC-initiated interactions.

Design of Common Board Response

Exemplary CBR consists of a single system, not broken down into subsystems, that receives LCNP commands. CBR processes LCNP commands and notifies the corresponding emulators. In addition, CBR is responsible for initial processing of the IOCBs such as IOCB validation and etc.

CBR includes a database of supported emulators and corresponding slot number on the PCI interface (read in from the registry).

At the bottom, CBR makes use of the upper interfaces of the PCI driver, namely, CreateFile, which attaches to the PCI device, and IOCTL, which reads from the PCI device unsolicited writes to I/O Space by the TDC. At the top, CBR relays TDC-initiated events to higher-level emulators which then "supply the function" required between the I/O activity. The Emulators "register" their interest in particular slots with CBR via a call to RegisterDevice. They then wait for notifications from CBR through the WaitForNoticeFromPdgThread interface (which is based on one or more conventional WINDOWS® NT® semaphores).

Figure 7:
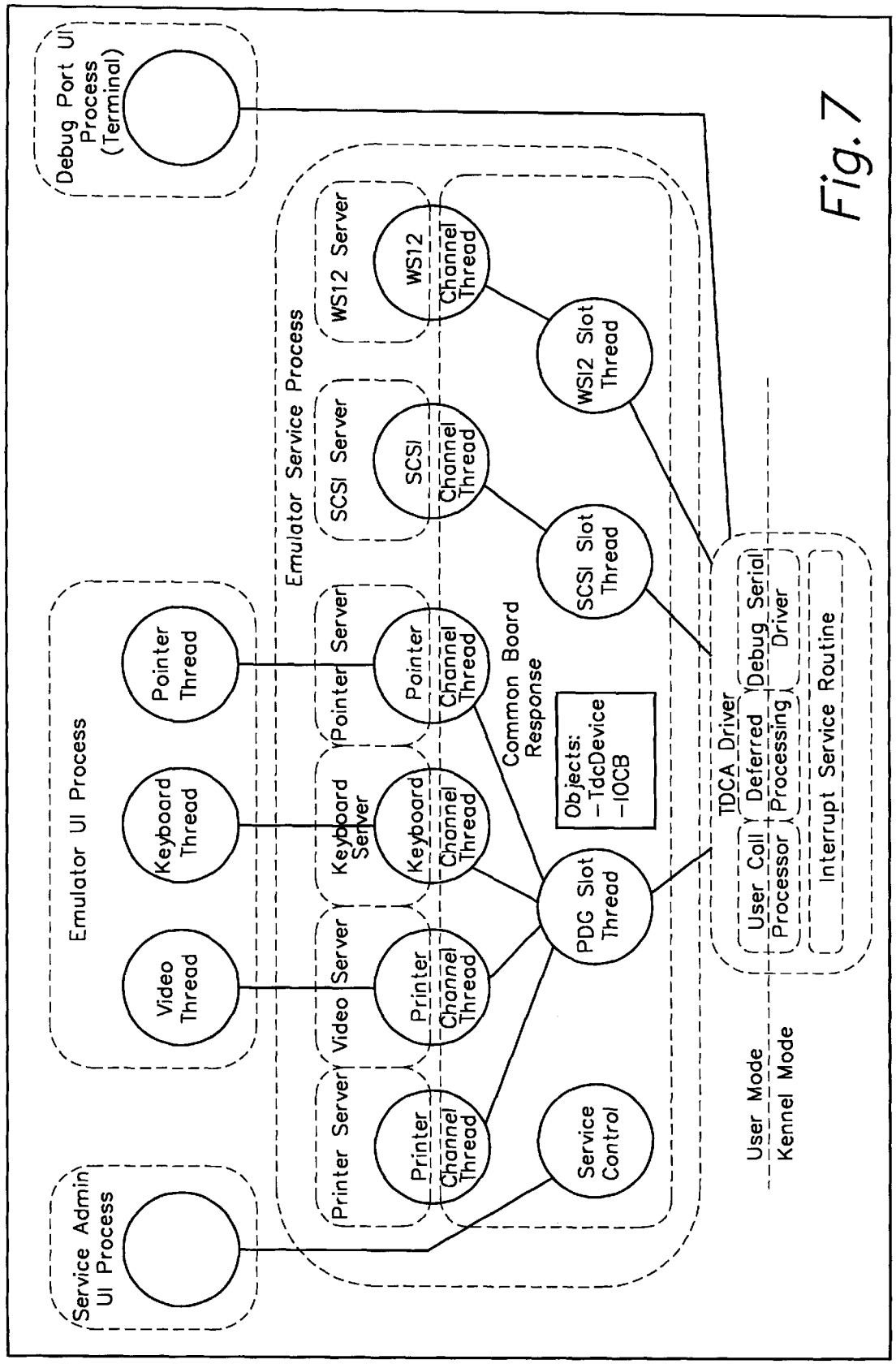
FIG. 7 illustrates a conceptual block diagram of an exemplary emulator thread model according to the principles of the present invention.

A pseudo-code embodiment of an exemplary CBR is attached hereto as an APPENDIX and is incorporated herein by reference for all purposes. The pseudo-code embodiment illustrates (1) how emulators above CBR are coded to use CBR services; (2) how CBR itself is "conceptually" structured; and (3) how the PCI Driver below is designed to support CBR needs. Turning momentarily to FIG. 7, illustrated is a conceptual block diagram of an exemplary emulator thread model according to the principles of the present invention (the concept of threads, tasks, subroutines, modular programming or the like are well known in the art, and use of any such term may suitably be synonymous with any other conventional program organization terminology), the model illustrating a select processing configuration of CBR, its associated emulators and LCNP, or TDCA, driver.

Design of Video Emulator

Exemplary video emulator consists of a single system, not broken down into subsystems, that is responsible for rendering video images specified by the TDC man-machine interface ("MMI") subsystem into the Native Window. The Native Window is a Microsoft® WINDOWS® window. The video images are specified by the TDC MMI via commands such as, Draw Line, Fill Rectangle, Draw Text, etc. These commands are communicated to the video emulator via the unsolicited target access interfaces provided by the common board response subsystem.

Not all commands sent by the TDC MMI are drawing commands. Several commands relate to text input port ("TIP") processing. These commands add complexity to the video emulator. In order to correctly handle TIP processing commands, the video emulator must access databases kept in TDC module bus memory and support simple text editing capabilities.

Managing the cursor shape is another responsibility of the video emulator. This emulator guarantees that the cursor is displayed in the correct shape. Different cursor shapes are displayed to indicate when the cursor lies in a conventional TIP or PICK area.

The video emulator is also responsible for displaying the initial frame, title bar, menu, and status bar of the Native Window. The video emulator also manages the "client area" of the Native Window. However, user input to the Native Window is managed by the keyboard and pointer emulators.

In order to correctly emulate the video functionality provided in the TDC US 150, the video emulator must maintain separate graphics and text images. These separate images are then blended together character-by-character as specified by priority levels. These priority levels are given by various drawing commands. The resultant image is displayed to the user in the Native Window.

Four databases may be used to perform this blending procedure, namely, (1) text image, a monochrome bitmap of all text currently shown on the screen; (2) graphics image, a monochrome bitmap of all graphics currently shown on the screen; (3) attribute matrix, an n by m matrix of attribute values, wherein n is the number of characters to fill the width of the screen and m is the number of characters to fill the height of the screen—an attribute value indicates the color, intensity, and blink attributes ascribed to the bits composing the character cell and this value additionally includes a priority which indicates how to blend the graphics relative to the text; and (4) blended image, a 16 color bitmap describing the actual image displayed on the screen, this image is required because blending directly to the screen results in unacceptable screen flickering.

There may also be three TDC module bus memory resident databases to support TIP processing commands and cursor shape management, namely, (1) TIP context array, that describes the location of TIP areas on the screen—used to correctly place text on the screen during TIP processing and manage the cursor shape; (2) screen image table, that includes ASCII values of text currently appearing on the screen; and (3) PICK area array, that describes the locations and other information of the PICK areas on the screen.

At the bottom, the video emulator uses the unsolicited target access interfaces at the top of CBR—the solicited target access interface of CBR are enlisted to read and write the module bus memory resident databases. At the top, the video emulator is a write-only application, providing no external interfaces—the interface to the Native Window is provided by the keyboard and pointer emulators.

Design of Keyboard Emulator

Exemplary keyboard emulator consists of a single system, not broken down into subsystems, that is responsible for communicating keyboard input to the TDC MMI. WINDOWS keycodes are converted to keycodes used by conventional TDC US 150 keyboards. The standard PC keyboard keycodes are mapped to the keycodes used by the conventional keyboard. Other special keyboards are mapped to the keycodes currently generated by those keyboards when attached to a conventional US 150. In particular, the TDC operator/engineering keyboard will be supported, when attached to the WINDOWS® NT® machine by a serial port interface.

Standard US 150 button configurator application is used to customize button functionality—no MS-WINDOWS based configuration software is required.

Although one might expect to find TIP processing functionality in the keyboard emulator, this functionality is actually supported in the video emulator. Keystrokes entered while the Native Window cursor is located in a TIP are processed exactly the same as all other keystrokes. The TDC MMI is responsible for determining that the keystrokes are related to a TIP. The TDC MMI responds by sending TIP processing commands. All TDC MMI commands are processed by the video emulator.

If the Native Window is configured with a menu or accelerators, the keyboard emulator performs the actions associated with the applicable key sequences. For instance, if the Native Window contains a file menu with a close menu item, the keyboard emulator closes the Native Window when the key sequence Alt+F+C is typed.

A single database per keyboard type is required by the keyboard emulator. These databases provide keycode mappings between keycodes generated by WINDOWS® NT® keyboard drivers and standard US 150 keycodes. The keyboard emulator also contains databases correlating key sequences to configured actions, at least one describes a Native Window menu and at least one other describes Native Window accelerator key sequences.

At the bottom, the keyboard emulator uses the solicited target access interfaces at the top of CBR that are used to communicate keystrokes to the TDC MMI. At the top, the keyboard emulator is a reader of keystroke events from WINDOWS® NT®, the standard WINDOWS keyboard mapping interface being provided. This interface causes the appropriate actions to be performed when key sequences related to the Native Window's menu and accelerators are typed. All other keystrokes are mapped to US 150 keycodes and communicated to the TDC MMI via the solicited target access interfaces provided by the CBR subsystem. The Native Window is constructed such that no key sequences required by US 150 are absorbed by the Native Window itself.

Design of Pointer Emulator

Exemplary pointer emulator consists of a single system, not broken down into subsystems, that is responsible for mapping input received from WINDOWS® pointing devices to TDC MMI events. Any conventional pointing device, including a mouse, trackball, non-native touch screen, track pad, etc., which is supported by a WINDOWS® NT® driver is supported by the pointer emulator. Screen touches are converted to left-button clicks by the WINDOWS® NT® touch screen driver. The pointer emulator converts left-button clicks occurring in the Native Window client area into TDC US 150 pick events.

The Pointer Emulator performs the expected actions when left-button clicks occur in the Native Window frame, menu, and/or status bar. The following includes examples of some of these expected actions, including move/resize window, maximize/minimize window, invoke menu selection, close window.

At the bottom, the pointer emulator uses the solicited target access interfaces at the top of CBR. These interfaces are used to communicate pick events to the TDC MMI. At the top, the pointer emulator is a reader of pointer events from WINDOWS® NT®. Standard WINDOWS interfaces are used to process pointer events when the cursor is in the various frames of the Native Window. Solicited target access interfaces are used to notify the TDC MMI when pointer clicks occur in the Native Window client area.

Design of WSI2 Emulator

Exemplary WSI2 emulator consists of a single system, not broken down into subsystems, that operates as a "dumb" board, not having a microprocessor onboard to generate complex functionality. However, the WSI2 emulator may include shared RAM which may be used as a mailbox area between the TDC and WINDOWS® NT®. This mailbox area may be intimately manipulated by a GUS data access system ("LXS") and is neither emulated nor manipulated in any way by the emulators or Native Window.

A reason for including a WSI2 emulator is for architectural consistency, as it is a board not unlike the other boards that have been emulated herein. In addition, a distinct emulator in the architecture provides a flex area for future functionality (e.g., interrupt handling), if desired.

At the bottom, the WSI2 emulator uses the solicited target access interfaces at the top of CBR—this is only in the event that interrupts are used at some time in the future. At the top, the WSI2 emulator has no defined functions at this time, as the board is intimately operated by GUS data access.

Design of SCSI Emulator

Exemplary SCSI emulator is responsible for handling requests for disk access from the file system and diagnostics software executing on LCNP. These requests take the form of actual SCSI commands which are processed by the emulator with the appropriate command responses being posted back to the LCNP.

Conventional US 150 disk subsystem contains one or more Bernoulli® disks with 150 Mb removable cartridges (earlier versions of the US used 20 Mb cartridges which are now largely obsolete). On the current system, or USNT 305, the emulator provides support for the LCNP disk requests by two methods, namely, (1) logical disk access; and (2) native format disk access.

An exemplary logical disk access method provides a logical disk that maybe managed as a "standard" file using WINDOWS® NT® file management facilities. A logical disk exists as a block of space which is managed as a single WINDOWS® NT® file. The emulator maps LCNP requests for reading or writing logical blocks (typically 256 bytes) to the appropriate offsets in the logical disks file and perform the data transfers. Because the actual data resides in WINDOWS® NT® compatible files, other applications, management tools or the like may access the data. For Instance, it would be possible to back up one of the logical disks by copying it to tape or other physical media.

If a Bernoulli drive is available, it may be used to hold the logical disk but it is important to note that the disk is formatted to be compatible with the WINDOWS® NT® file system, and therefore non-native.

When using logical disks, the user may be able to specify the desired disk size and may, optionally, be able to specify whether or not the space is to be pre-allocated or should be allocated as required. By associating the logical disks with files on the hard disk, it is possible to provide LCNP services without requiring a Bernoulli® drive. In addition, multiple logical files may be created and maintained on the disk for subsequent access from the LCNP (requiring a logical mount/dismount).

An exemplary native format disk access supports the use of native format Bernoulli® cartridges which were created on an LCNP. The format of the disk is unknown by the WINDOWS® NT® file system and all data transfers are performed using WINDOWS® NT® physical disk access services. Since the native disk format is not understood by the WINDOWS® NT® file system, no access to the data from applications other than an emulator of the present embodiment may be suitably performed.

Exemplary SCSI emulator, in addition to emulating the SCSI disk access commands from LCNP, the emulator may also provide an interface for defining and managing the logical disks. Exemplary functions may suitably include create disk, mount disk, unmount disk, delete disk, configure, or other like functions.

The SCSI emulator consists of a single system, not broken down into subsystems.

In order to emulate the SCSI disk accesses for the LCNP, the SCSI emulator may maintain both "static" and "dynamic" information. The static information describes the emulated disks and their properties and resides in the WINDOWS® NT® registry. The dynamic information consists of information specific to the current runtime environment and resides in the memory space of the emulator application at execution time.

At the bottom, the SCSI emulator uses the interfaces at the top of CBR. At the top, the keyboard emulator interacts with the WINDOWS® NT® provided system services for accessing logical or native format disks.

Design of Printer Emulator

Exemplary printer emulator consists of a single system, not broken down into subsystems, that is responsible for handling requests to print from software running on the LCNP board.

At the bottom, printer emulator uses the interfaces at the top of CBR. At the top, the printer emulator is a writer to various printer drivers in the WINDOWS® NT® system.

Design of Debug Port Emulator

Exemplary debug port emulator consists of a single system, not broken down into subsystems, although it includes two sub-parts, namely, (1) the debug PCI driver support, and (2) the WINDOWS® NT® terminal program.

A programmatic interface in the debug port emulator is that provided by the debug port portion of the PCI driver to the WINDOWS® NT® terminal program. The interface makes the "channel" through which terminal communications look like a serial port, even though it is really talking to a set of registers on the LCNP instead. There is also a human interface for the debug port emulator, included with this interface are facilities for typing to and seeing output from the LCNP. In addition, the terminal program has logging facilities and support standard cut and paste operations.

Functional Model of PCI Driver

Figure 8:
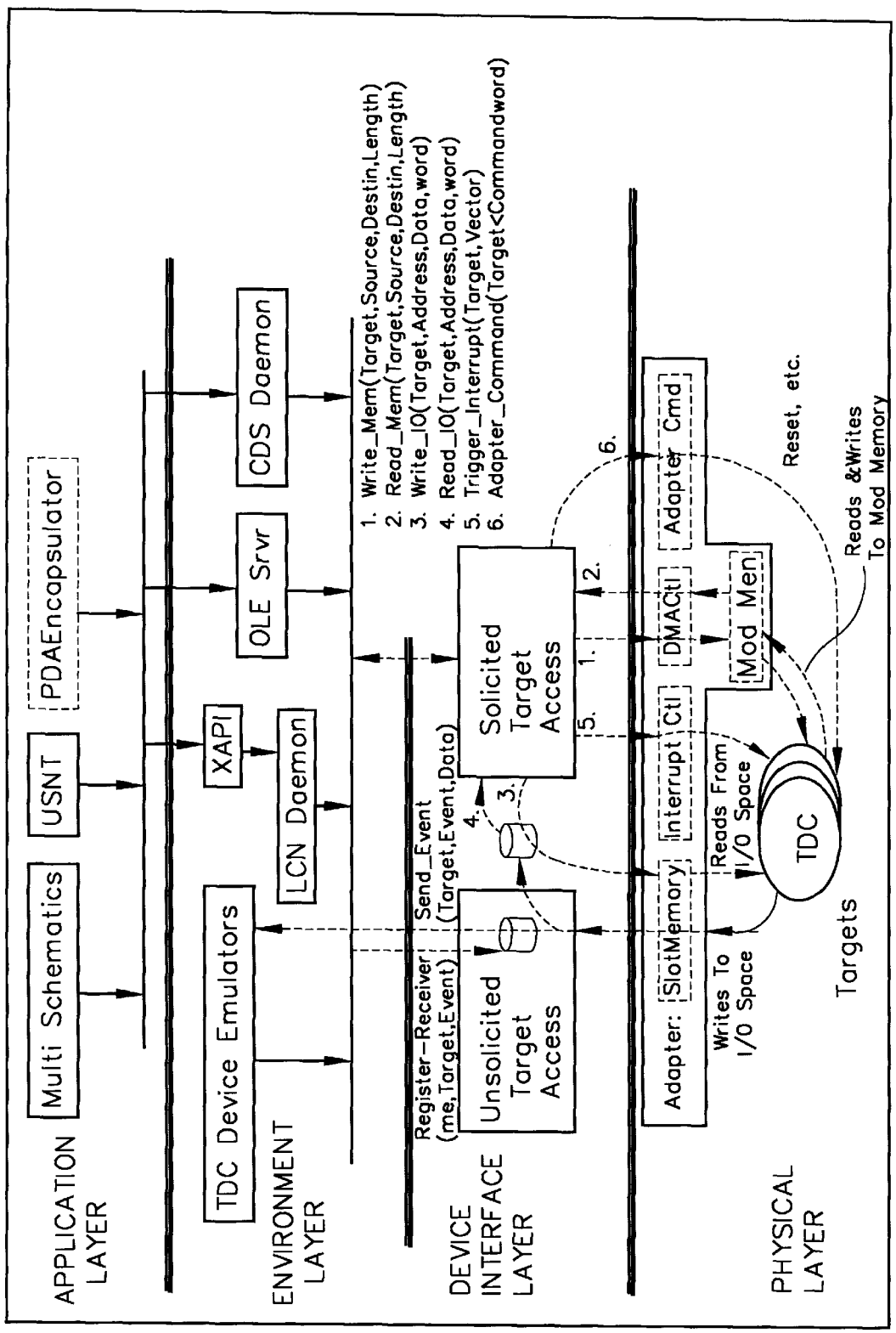
FIG. 8 illustrates a conceptual block diagram of an exemplary functional design model of a PCI driver according to the principles of the present invention.

Turning now to FIG. 8, illustrated is a conceptual block diagram of an exemplary functional design model of PCI driver according to the principles of the present invention. Exemplary PCI Driver exists within the Device Interface Layer layer of the architecture. It consists of two subsystems, the solicited target access and the unsolicited target access. It contains two databases, the slot memory and the interrupt receiver registry.

Solicited target access supports interactions initiated by WINDOWS® NT®. Interactions may be initiated by emulators providing the Native Window functionality, by servers and Daemons supporting higher-level application functionality, or both. Interactions may be intermixed without explicit synchronization or coordination on the part of its users; any required serialization is provided invisibly within the PCI driver.

The solicited target access subsystem includes six exemplary interfaces. Two are for reading and writing module memory, two are for reading and writing I/O space memory, one is for generating interrupts, and one is for generating board-related commands (e.g., a reset) to the LCNP. The illustrated dotted-line connections between the solicited target access box and the adapter card in the physical layer are numbered to correspond to the upper solicited target access interfaces.

Unsolicited target access provides an interface by which its users (environment layer device emulators) can register their interest in writes to I/O space by the TDC. Then, as writes to I/O space occur, interested parties are determined from the registration database and informed of the write event. In addition—and regardless of whether any interested parties are registered for specific writes—unsolicited target access updates the slot memory cache database which is accessed by solicited target access for I/O-space reads.

All commands have as a parameter the "target" device. In alternate embodiments, the target will allow the specification of one of several applicable LCNP boards. In the present implementation, this parameter will be specified as "0".

From the above, it is apparent that the present invention provides a system for, and method of, emulating, on a non-native computer, a native environment for a user interface object file for a real time process control system and a real time process control system employing the emulator. The user interface object file contains a drawing command, an address pointer for communicating data with the real time process control system and a rule for interpreting data received from a touch-sensitive screen. The system includes: (1) a display routine that causes the non-native computer to control a non-native visual display coupled thereto to display an image thereon as a function of the drawing command, (2) an address mapping routine that communicates the data between the user interface object file and the real time process control system as a function of the address pointer and (3) an input translation routine that translates data received into the non-native computer from a non-native pointing device coupled thereto into data suitable for interpretation by the rule, the system thereby allowing the non-native computer to display the image, communicate the data with the real time process control system and interpret the data received from the non-native pointing device.

Although the present invention and its advantages have been described in detail, those skilled in the art should understand that they can make various changes, substitutions and alterations herein without departing from the spirit and scope of the invention in its broadest form.

APPENDIX

```
//EMULATOR (typical)

/////////////////////////////////////////////////////////////////////// main ()
  5  {
       // GENERAL SYSTEM CONFIGURATION
       Obtain Configuration
       Initialize Target/Slot/Channel table
       Initialize shared data bases
 10    // START EMULATORS
       For each LCNP Target
       {
          Get handle to LCNP
          if (EpdgPdgEmulator)
 15          Start EpdgPdgThread(IN Target);
          if (EpdgScsiEmulator)
             Start EpgdScsiThread(IN Target);
          if (WSIEmulator)
             Start WSIThread(IN Target);
 20       if (EpdgDebugPortEmulator)
             Start DebugPortThread(IN Target);
          Wait for Acknowledgement from the started threads
          Rlease the LCNP reset
          close LCNP handle
 25    }
         wait for service control manager messages which turn the CBR
       services on or off
     }

///////////////////////////////////////////////////////////////////////

30  hSemaphore RegisterDevice(IN DeviceObject, IN PdgOrScsiDeviceHandle )
     {
       Add Target/Slot/Channel to table
       Create syncronization object (semaphore?)
       return semaphore
 35  }

///////////////////////////////////////////////////////////////////////
     <??>

PdgSlotThread(IN Target, IN Slot)
     {
 40    PdgSlotPathName = F(Target,Slot);
       PdgSlotHandle = CreateFile(PdgSlotPathName,...);
```

−69−

```
        Initialize LCNP slot;

if need video emulator
            {
            open named pipe videoPipe
 5          start VideoEmulatorThread(IN target, IN slot, IN pdgHandle
                                                        , IN videoPipe);
            read videoPipe;
            }
        if need keyboard emulator
10          {
            open named pipe keybdPipe
            start keybdEmulatorThread(IN target, IN slot, IN pdgHandle
                                                        , IN keybdPipe);
            read keybdPipe;
15          }
        if need pointer emulator
            {
            open named pipe pointerPipe
            start pointerEmulatorThread(IN target, IN slot, IN pdgHandle
20                                                       , IN pointerPipe);
            read keybdPipe;
            }
        if need printer
            {
25          open named pipe printerPipe
            start printerEmulatorThread(IN target, IN slot, IN pdgHandle
                                                        ,IN printerPipe);
            read printerPipe;
            }
30      wait for acknowledgement for the started threads;
        send acknowledgement to parent thread (thread "0");

//common board response command processing:
        while (EmulatorRunning)
        {
35         deviceIOCtl(pdgSlotHandle, getCommand)
           switch(command)
```

-70-

```
        {
          case 'videoCommand':
              write command to named pipe for the video emulator
          case 'keyboardCommand':
5             write command to named pipe for the keyboard emulator
          case 'pointerDeviceCommand':
              write command to named pipe for the pointer emulator
          case 'printerCommand':
              write command to named pipe for the printer emulator
10      }
      }

//////////////////////////////////////////////////////////////////////

ScsiSlotThread(IN Target, IN Slot)
      {
15        ScsiSlotPathName = F(Target, Slot);
          ScsiSlotHandle = CreateFile(ScsiSlotPathName,...)
          initialize LCNP slot;
          open named pipe SCSIPipe
          start SCSIEmulatorThread(IN Target, IN Slot, IN ScsiSlotHandle
20                                                    , IN SCSIPipe);
          wait for acknowledgement for the started SCSI thread;
          send acknowledgement to parent thread (thread "0");

//common board response command processing:
          while (EmulatorRunning)
25        {
             deviceIOCtl(ScsiSlotHandle, getCommand);
             write command to SCSI named pipe for the SCSI emulator;
          }
      //////////////////////////////////////////////////////////////////////

30    WSISlotThread(IN Target, IN Slot)
      {
          WSISlotPathName = F(Target, Slot);
          WSISlotHandle = CreateFile(WSISlotPathName,...)
          initialize LCNP slot;
```

```
            open named pipe WSIPipe
            wait for acknowledgement for the started WSI thread;
            send acknowledgement to parent thread (thread "0");

//Note, no commands for the WSI
 5

/////////////////////////////////////////////////////////////////////// videoEmulatorThread(IN target, IN slot, IN pdgHandle, IN videoPipe);
        {
            create named pipe videoPipe, and get handle to it
10          //create device object and get handle to it
            hdev = createDeviceObject(IN target, IN slot, IN slotHandle
                                                , IN channel, IN pipeHandle);
            //do any other initialization;
            while (EmulatorRunning)
15          {
                read commands from the named pipe;
                switch (command)
                {
                  case 'start-command':
20                {
                      //call method in IOCB object to initialize the IOCB
                      pdgIOCB::init(IOCBAddrInTDCMemory);
                      //complete the start-command
                      command_complete(hdev, command, operational-status);
25                    while (validIOCB())
                      {
                          process iocb buffer
                          //call method in IOCB object to complete the IOCB
                          pdgIOCB::complete(IOCBStatus, size);
30                    }
                  }
                  case 'other-command':
                  {
                      //process command
```

```
            }
        }
    }

5   /////////////////////////////////////////////////////////////////////// keybdEmulatorThread(IN target, IN slot, IN pdgHandle, IN keybdPipe);
    {
        create named pipe keybdPipe, and get handle to it
        //create device object and get handle to it
10      hdev = createDeviceObject(IN target, IN slot, IN slotHandle
                                    , IN channel, IN pipeHandle);
        //do any other initialization;
        while (EmulatorRunning)
        {
15          read commands from the named pipe;
            switch (command)
            {
              case 'start-command':
              {
20                //call method in IOCB object to initialize the IOCB
                  pdgIOCB::init(IOCBAddrInTDCMemory);
                  //complete the start-command
                  command_complete(hdev, command, operational-status);
                  while (validIOCB())
25                {
                      process iocb buffer
                      //call method in IOCB object to complete the IOCB
                      pdgIOCB::complete(IOCBStatus, size);
                  }
30            }
              case 'other-command':
              {
                  //process command
              }
35        }
        }
```

-73-

```
    //////////////////////////////////////////////////////////////////////// pointerEmulatorThread(IN target, IN slot, IN pdgHandle, IN pointerPipe);
    {
        create named pipe pointerPipe, and get handle to it
5       //create device object and get handle to it
        hdev = createDeviceObject(IN target, IN slot, IN slotHandle
                                    , IN channel, IN pipeHandle);
        //do any other initialization;
        while (EmulatorRunning)
10      {
            read commands from the named pipe;
            switch (command)
            {
                case 'start-command':
15              {
                    //call method in IOCB object to initialize the IOCB
                    pdgIOCB::init(IOCBAddrInTDCMemory);
                    //complete the start-command
                    command_complete(hdev, command, operational-status);
20                  while (validIOCB())
                    {
                        process iocb buffer
                        //call method in IOCB object to complete the IOCB
                        pdgIOCB::complete(IOCBStatus, size);
25                  }
                }
                case 'other-command':
                {
                    //process command
30              }

}
        }
    ////////////////////////////////////////////////////////////////////////

35  printerEmulatorThread(IN target, IN slot, IN pdgHandle, IN printerPipe);
```

-74-

```
      {
         create named pipe printerPipe,  and get handle to it
         //create device object and get handle to it
         hdev = createDeviceObject(IN target, IN slot, IN slotHandle
 5                                        , IN channel, IN pipeHandle);
         //do any other initialization;
         while (EmulatorRunning)
         {
            read commands from the named pipe;
10          switch (command)
            {
               case 'start-command':
               {
                  //call method in IOCB object to initialize the IOCB
15                pdgIOCB::init(IOCBAddrInTDCMemory);
                  //complete the start-command
                  command_complete(hdev, command, operational-status);
                  while (validIOCB())
                  {
20                   process iocb buffer
                     //call method in IOCB object to complete the IOCB
                     pdgIOCB::complete(IOCBStatus, size);
                  }
               }
25             case 'other-command':
               {
                  //process command
               }
           }
30      }
     }

////////////////////////////////////////////////////////////////// scsiEmulatorThread(IN target, IN slot, IN pdgHandle, IN scsiPipe);
     {
```

-75-

```
            create named pipe scsiPipe, and get handle to it
            //create device object and get handle to it
            hdev = createDeviceObject(IN target, IN slot, IN slotHandle
                                     , IN channel, IN pipeHandle);
 5          //do any other initialization;
            while (EmulatorRunning)
            {
               read commands from the named pipe;
               switch (command)
10             {
                  case 'start-command':
                  {
                     //call method in IOCB object to initialize the IOCB
                     ScsiIOCB::init(IOCBAddrInTDCMemory);
15                   //complete the start-command
                     command_complete(hdev, command, operational-status);
                     while (validIOCB())
                     {
                        process iocb buffer
20                      //call method in IOCB object to complete the IOCB
                        ScsiIOCB::complete(IOCBStatus, size);
                     }
                  }
                  case 'other-command':
25                {
                     //process command
                  }

}
30       }

DEBUG PORT EMULATOR

////////////////////////////////////////////////////////////////////////

DebugPortThread(IN Target, IN Slot)
         {
```

```
        // CONNECT TO DRIVER
        DebugPortHandle = CreateFile(DebugPortPathName,...);

// START THREAD FOR UNSOLICITED INPUT
        Start DebugUIThread()

5       // RUN CONTINUOUSLY UNTIL TERMINATED
        while (EmulatorRunning)
        {
          // READ A DEBUG COMMAND
          DeviceIoControl(DebugPortHandle,...)

10        // GIVE DEBUG COMMAND TO TDC CONSOLE EMULATOR
          process request on debug port
        }
        }

CLASSES/OBJECTS 15      class physicalBuffer
        {
        public:
          memoryAdress;
          memorySpace[8];
20      } class TdcBuffer
        {
          pointerToNTCopyMemory;
          size;
25        direction;
          currentIndex;
        public:
          initialize(pointerToTDCBuffer, size, direction);
          initialize(TDCBufferAddress, size, direction);
30        complete(transferred);
          getNextWord();
```

-77-

```
      getBufferAddress();
      *operator*() {return getBufferAddress(); };
   } class Iocb
   {
   protected:
      TDCiocb    // place to hold TDC IOCB in the NT environment
      TDCBuffer  Buffer   // wrapper for TDC buffer
      virtual long GetBufferAddress() = 0;
      long getNextAddress() {return LCNPddrToULong(&IocbAddress);
   public:
      initialize(IocbAddressInTdcMemory);
      initialize(pointerToLCNPddressOfIocb);
      complete(IocbStatus, transferred);  //complete IOCB
      TdcBuffer *GetBuffer(Direction);
      GetTransferSize();  // report buffer size to transfer
   } class pdgIocb
   {
   protected:
      virtual long GetBufferAddress;
   public:
      initialize(IocbAddressInTdcMemory);
      initialize(pointerToLCNPddressOfIocb);
      complete(IocbStatus, transferred);  //complete IOCB
      TdcBuffer *GetBuffer(Direction);
      GetTransferSize();  // report buffer size to transfer
   } class ScsiIocb
   {
   protected:
      virtual long GetBufferAddress;
   public:
      initialize(IocbAddressInTdcMemory);
      initialize(pointerToLCNPddressOfIocb);
```

-78-

```
      complete(IocbStatus, transferred);  //complete IOCB
      TdcBuffer *GetBuffer(Direction);
      GetTransferSize();  // report buffer size to transfer
      *GetSuffix()    // get a pointer to the IOCB suffix
5   };

////////////////////////////////////////////////////////////////////////////

LCNP DRIVER

// THIS ROUTINE HANDLES EPDG INTERRUPTS FROM THE LCNP
    IoSpaceWriteIsr ( IN Target, IN AddressWritten )
10  {
       // ARE THERE ANY VERY QUICK THINGS THE DRIVER HANDLES ITSELF? DO IT HERE
       Irb[ ] = AddressWritten ;
       Irb[ ] = Target ;
       QueueIoSpaceWriteDpcRoutine ;
15  }

// THIS ROUTINE HANDLES DEBUG PORT INTERRUPTS FROM THE LCNP
    DebugPortWriteIsr ( IN Target, IN AddressWritten )
    {
       // ARE THERE ANY VERY QUICK THINGS THE DRIVER HANDLES ITSELF? DO IT HERE
20     Irb[ ] = AddressWritten ;
       Irb[ ] = Target ;
       QueueDebugPortWriteDpcRoutine ;
    }

QueueIoSpaceWriteDpcRoutine ( IN Irb )
25  {
       // PICK UP INFO ABOUT WHO WROTE TO I/O SPACE
       AddressWritten = Irb[] ;
       Target = Irb[] ;
       // calculate base pointer for target that interrupted
```

-79-

```
        // GET THE DATA THAT WAS WRITTEN AT THIS ADDRESS
        DataWritten = SomePCIcomamndsToRead ( IN Target, IN AddressWritten ) ;
        IoCacheMemory[Target, AddressWritten] = DataWritten ;

// CALCULATE THE SLOT
  5     Slot = (AddressWritten - $40000) / $1000 ;

// IS IT SOMETHING THE DRIVER RESPONDS TO DIRECTLY? IF SO, DO IT HERE

// WAS THIS A COMMAND WRITE? IF SO, GET THE ADDRESS OF THE FIRST IOCB
        if ((AddressWritten AND $FF) = $8)
          {
 10        // GET THE CHANNEL CONTROL BLOCK FOR THE CHANNEL OF INTEREST
           CcbAddress = BaseAddress + $80400 + (Slot * $1000) ;
           IocbAddressPointer = BaseAddress + CcbAddress + (Channel * 4) ;
           IocbAddress = SomePciCommandsToRead ( IN Target, IN CcbAddressPointer );
          }
 15     else
           IocbAddress = 0 ;

// DISTRIBUTE THE EVENT
        if (some thread waiting for that slot)
           wake that thread
 20     else
           remember this write for later
        }

QueueDebugPortWriteDpcRoutine( IN Irb )
        {
 25       // PICK UP INFO ABOUT WHO WROTE TO I/O SPACE
          AddressWritten = Irb[] ;
          Target = Irb[] ;
        if (some thread waiting for that slot)
           wake that thread
 30     else
           remember this write for later
        }
```

-80-

```
         // THIS FUNCTION HANDLES DeviceIoControl() FROM EMULATOR SERVICE
         Status ReadFunctionInDriver ( IN Handle, IN WaitForData,
                                       IN Target, IN Slot,
                                       OUT AddressWritten, OUT WordWritten )
 5       {
           if (a remembered write is pending)
             erase record of remembered write
             return immediately with AddressWritten and DataWritten
           else
10           record that we are waiting for this slot
             sleep
         }
```

What is claimed is:

1. A system for emulating, on a non-native computer, a native environment for a visual display object file for a real time process control system, said visual display object file containing a drawing command, an address pointer for communicating data with said real time process control system and a rule for interpreting data received from a touch-sensitive screen, said system comprising:

a display routine that causes said non-native computer to control a non-native visual display coupled thereto to display an image thereon as a function of said drawing command;

an address mapping routine that communicates said data between said visual display object file and said real time process control system as a function of said address pointer; and an input translation routine that translates data received into said non-native computer from a non-native pointing device coupled thereto into data suitable for interpretation by said rule, said system thereby allowing said non-native computer to display said image, communicate said data with said real time process control system and interpret said data received from said non-native pointing device.

2. The system as recited in claim 1 wherein said native environment is provided on a minicomputer and said non-native computer is microprocessor-based.

3. The system as recited in claim 1 wherein said drawing command is directed to a whole-screen visual display and said non-native visual display is a windowed display.

4. The system as recited in claim 1 wherein said address pointer corresponds to a physical address in said real time process control system.

5. The system as recited in claim 1 wherein said non-native pointing device is a mouse.

6. The system as recited in claim 1 wherein said address mapping routine allows bidirectional communication of data between said visual display object file and said real time process control system.

7. The system as recited in claim 1 wherein said system operates in conjunction with a multitasking operating system executing on said non-native computer.

8. The system as recited in claim 1 wherein said drawing command, address pointer and rule are embodied in separate objects within said visual display object file.

9. The system as recited in claim 1 wherein said non-native computer comprises a virtual storage device emulator that emulates a removable-media mass storage device, said emulator cooperating with said address mapping routine to provide communication of said data between said visual display object file and said real time process control system.

10. The system as recited in claim 1 wherein said system is executed within a WINDOWS® NT® operating system executing on said non-native computer, said operating system providing a channel therethrough for communicating said data between said visual display object file and said real time process control system.

11. A method of emulating, on a non-native computer, a native environment for a visual display object file for a real time process control system, said visual display object file containing a drawing command, an address pointer for communicating data with said real time process control system and a rule for interpreting data received from a touch-sensitive screen, said method comprising the steps of:

causing said non-native computer to control a non-native visual display coupled thereto to display an image thereon as a function of said drawing command;

communicating said data between said visual display object file and said real time process control system by mapping as a function of said address pointer; and translating data received into said non-native computer from a non-native pointing device coupled thereto into data suitable for interpretation by said rule, said system thereby allowing said non-native computer to display said image, communicate said data with said real time process control system and interpret said data received from said non-native pointing device.

12. The method as recited in claim 11 wherein said native environment is provided on a minicomputer and said non-native computer is microprocessor-based.

13. The method as recited in claim 11 wherein said drawing command is directed to a whole-screen visual display, said step of causing comprising the step of employing said drawing command with a windowed display.

14. The method as recited in claim 11 wherein said address pointer corresponds to a physical address in said real time process control system.

15. The method as recited in claim 11 wherein said non-native pointing device is a mouse.

16. The method as recited in claim 11 wherein said step of communicating comprising the step of bidirectionally communicating said data between said visual display object file and said real time process control system.

17. The method as recited in claim 11 wherein said system operates in conjunction with a multitasking operating system executing on said non-native computer.

18. The method as recited in claim 11 wherein said drawing command, address pointer and rule are embodied in separate objects within said visual display object file.

19. The method as recited in claim 11 wherein said non-native computer comprises the step of emulating a removable-media mass storage device with an emulator, said emulator cooperating with said address mapping routine to provide communication of said data between said visual display object file and said real time process control system.

20. The method as recited in claim 11 wherein said system is executed within a WINDOWS® NT® operating system executing on said non-native computer, said method further comprising the step of providing a channel through said operating system for communicating said data between said visual display object file and said real time process control system.

21. A real-time process control system, comprising:

a plurality of sensors and controllable devices;

a local control network bus coupling said plurality of sensors and controllable devices to a plurality of data processing and storage units;

an operator information system, coupled to said local control network bus, that provides data concerning said plurality of sensors to an operator and allows said operator to control said plurality of controllable devices, said operator information system being emulated in a non-native computer; and a system for emulating, on said non-native computer, a native environment for a visual display object file for said real time process control system, said visual display object file containing drawing commands, address pointers for communicating data with said real time process control system and rules for interpreting data received from a touch-sensitive screen, said system including:

a display routine that causes said non-native computer to control a non-native visual display coupled thereto to display an image thereon as a function of said drawing commands, an address mapping routine that communicates said data between said visual display object file and said real time process control system as a function of said address pointers, and an input translation routine that translates data received into said non-native computer from a non-native pointing device coupled thereto into data suitable for interpretation by said rules, said system thereby allowing said non-native computer to display said image, communicate said data with said real time process control system and interpret said data received from said non-native pointing device.

22. The process control system as recited in claim 21 wherein said native environment is provided on a minicomputer and said non-native computer is microprocessor-based.

23. The process control system as recited in claim 21 wherein said drawing commands are directed to a whole-screen visual display and said non-native visual display is a windowed display.

24. The process control system as recited in claim 21 wherein said address pointers correspond to physical addresses of said plurality of sensors and controllable devices.

25. The process control system as recited in claim 21 wherein said non-native pointing device is a mouse.

26. The process control system as recited in claim 21 wherein said address mapping routine allows bidirectional communication of data between said visual display object file and said plurality of sensors and controllable devices.

27. The process control system as recited in claim 21 wherein said system operates in conjunction with a multitasking operating system executing on said non-native computer.

28. The process control system as recited in claim 21 wherein said drawing commands, address pointers and rules are embodied in separate objects within said visual display object file.

29. The process control system as recited in claim 21 wherein said non-native computer comprises a virtual storage device emulator that emulates a removable-media mass storage device, said emulator cooperating with said address mapping routine to provide communication of said data between said visual display object file and said plurality of sensors and controllable devices.

30. The process control system as recited in claim 21 wherein said system is executed within a WINDOWS® NT® operating system executing on said non-native computer, said operating system providing a channel therethrough for communicating said data between said visual display object file and said plurality of sensors and controllable devices.

31. For use in a real time process control system having a plurality of elements addressable via logical blocks stored in a native-formatted removable-media mass storage device, an emulator, executable in a non-native, multitasking operating system and employable in lieu of said mass storage device, comprising:

a block storage file, having a structure compatible with said non-native, multitasking operating system, for containing said logical blocks; and an address mapping routine that cooperates with said block storage file and intercedes between a native visual display object file and said real time process control system to allow communication of data therebetween as a function of an address pointer in said native visual display object file, said address mapping routine developing an offset from said address pointer that corresponds to a particular logical block in said block storage file, said block storage file and address mapping routine thereby substitutable for said mass storage device without requiring modifications to said visual display object file.

32. The emulator as recited in claim 31 wherein said multitasking operating system is WINDOWS® NT®.

33. The emulator as recited in claim 31 wherein said block storage file is stored on a non-native mass storage device.

34. The emulator as recited in claim 31 wherein other routines executing in said multitasking operating system are capable of using said block storage file concurrently with said address mapping routine.

35. The emulator as recited in claim 31 wherein said particular logical block is 256 bytes in length.

36. The emulator as recited in claim 31 wherein said block storage file is stored on a single physical disk drive.

37. The emulator as recited in claim 31 further comprising a second block storage file, said address mapping routine being capable of alternatively cooperating with said second block storage file to intercede between said native visual display object file and said real time process control system to allow communication of said data therebetween.

38. For use in a real time process control system having a plurality of elements addressable via logical blocks stored in a native-formatted removable-media mass storage device, a method executable in a non-native, multitasking operating system of emulating said mass storage device, comprising the steps of:

intercepting an address pointer of a native visual display object file; and developing an offset from said address pointer that corresponds to a particular logical block in a block storage file, said block storage file having a structure compatible with said non-native, multitasking operating system and containing said logical blocks.

39. The method as recited in claim 38 wherein said multitasking operating system is WINDOWS® NT®.

40. The method as recited in claim 38 further comprising the step of storing said block storage file on a non-native mass storage device.

41. The method as recited in claim 38 further comprising the step of executing other routines in said multitasking operating system, said other routines capable of using said block storage file concurrently with said address mapping routine.

42. The method as recited in claim 38 wherein said particular logical block is 256 bytes in length.

43. The method as recited in claim 38 further comprising the step of storing said block storage file on a single physical disk drive.

44. The method as recited in claim 38 further comprising the step of developing said offset from said address pointer that corresponds to said particular logical block in a second block storage file.

45. A real-time process control system, comprising:

a plurality of sensors and controllable devices addressable via logical blocks stored in a native-formatted removable-media mass storage device;

a local control network bus coupling said plurality of sensors and controllable devices to a plurality of data processing and storage units; and an operator information system, coupled to said local control network bus, for providing data concerning said plurality of sensors to an operator and allowing said operator to control said plurality of controllable devices, said operator information system being emulated in a non-native computer and having a native visual display object file containing an address pointer and an emulator, executable in a non-native, multitasking operating system executing and employable in lieu of said mass storage device, said emulator including:

a block storage file, having a structure compatible with said non-native, multitasking operating system, for containing said logical blocks, and an address mapping routine that cooperates with said block storage file and intercedes between said native visual display object file and said real time process control system to allow communication of data therebetween as a function of said address pointer, said address mapping routine developing an offset from said address pointer that corresponds to a particular logical block in said block storage file, said block storage file and address mapping routine thereby substitutable for said mass storage device without requiring modifications to said visual display object file.

46. The process control system as recited in claim 45 wherein said multitasking operating system is WINDOWS® NT®.

47. The process control system as recited in claim 45 wherein said block storage file is stored on a non-native mass storage device.

48. The process control system as recited in claim 45 wherein other routines executing in said multitasking operating system are capable of using said block storage file concurrently with said address mapping routine.

49. The process control system as recited in claim 45 wherein said particular logical block is 256 bytes in length.

50. The process control system as recited in claim 45 wherein said block storage file is stored on a single physical disk drive.

51. The process control system as recited in claim 45 further comprising a second block storage file, said address mapping routine being capable of alternatively cooperating with said second block storage file to intercede between said native visual display object file and said real time process control system to allow communication of said data therebetween.

* * * * *